(12) United States Patent
Nakata et al.

(10) Patent No.: US 6,317,429 B1
(45) Date of Patent: Nov. 13, 2001

(54) COMMUNICATION APPARATUS, NETWORK SYSTEM USING COMMUNICATION APPARATUS AND CONTROL METHOD USED IN NETWORK SYSTEM

(75) Inventors: Toru Nakata, Kawasaki; Noboru Yamamoto, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/116,781

(22) Filed: Jul. 16, 1998

(30) Foreign Application Priority Data

Jul. 18, 1997 (JP) .................................................. 9-193829
Dec. 24, 1997 (JP) .................................................. 9-355028

(51) Int. Cl.[7] .................................................. H04J 3/00
(52) U.S. Cl. .......................................................... 370/360
(58) Field of Search .................................. 370/360, 428, 370/412, 413, 389, 414–418, 229, 230, 221–225, 227, 228, 254, 252, 224, 36; 340/825.01, 825.03; 374/227

(56) References Cited

U.S. PATENT DOCUMENTS 5,949,755 * 9/1999 Uphadya et al. ..................... 370/224
6,122,249 * 9/2000 Mochizaki et al. .................. 370/224

FOREIGN PATENT DOCUMENTS

| 0 717 522 A | 6/1996 | (EP) . |
| 8-172394 | 7/1996 | (JP) . |
| 8-237306 | 9/1996 | (JP) . |
| 9-55758 | 2/1997 | (JP) . |
| 9-121229 | 5/1997 | (JP) . |
| 9-261259 | 10/1997 | (JP) . |

OTHER PUBLICATIONS

A copy of a communication (European Search Report( from the European Patent Office (Dated Jul. 5, 2001).

Wagner S. S. et al, "Multiwavelength Ring Networks for Switch Consolidation and Interconnection", Chicago, Jun. 14–18, 1992. Bound together with Bo190710, vol. 4, New York, IEEE, US, vol. 14, Jun. 1992, 1173–1179.

* cited by examiner

Primary Examiner—Dang Ton
(74) Attorney, Agent, or Firm—Morgan & Finnegan, L.L.P.

(57) ABSTRACT

A communication apparatus capable of transmitting a signal to a first channel group in a first transmission direction and a second channel group in a second transmission direction. When a signal received from the first channel group is outputted to the second channel group, a channel is selected from the second channel group.

52 Claims, 12 Drawing Sheets

FIG. 3

| CONTROL ADDRESS / INPUT TERMINAL | PHASE 1 | PHASE 2 | PHASE 3 | PHASE 4 |
|---|---|---|---|---|
| IN1 | OUT1 | OUT2 | OUT3 | OUT4 |
| IN2 | OUT2 | OUT3 | OUT4 | OUT1 |
| IN3 | OUT3 | OUT4 | OUT1 | OUT2 |
| IN4 | OUT4 | OUT1 | OUT2 | OUT3 |

FIG. 4
(PRIOR ART)

| CONTROL ADDRESS / INPUT TERMINAL | A1 | A2 | A3 | A4 | A5 | A6 | A7 | A8 |
|---|---|---|---|---|---|---|---|---|
| IN1 | OUT1 λ1 | OUT2 λ2 | OUT3 λ3 | OUT4 λ4 | OUT5 λ5 | OUT6 λ6 | OUT7 λ7 | OUT8 λ8 |
| IN2 | OUT2 λ2 | OUT3 λ3 | OUT4 λ4 | OUT5 λ5 | OUT6 λ6 | OUT7 λ7 | OUT8 λ8 | OUT1 λ1 |
| IN3 | OUT3 λ3 | OUT4 λ4 | OUT5 λ5 | OUT6 λ6 | OUT7 λ7 | OUT8 λ8 | OUT1 λ1 | OUT2 λ2 |
| IN4 | OUT4 λ4 | OUT5 λ5 | OUT6 λ6 | OUT7 λ7 | OUT8 λ8 | OUT1 λ1 | OUT2 λ2 | OUT3 λ3 |
| IN5 | OUT5 λ5 | OUT6 λ6 | OUT7 λ7 | OUT8 λ8 | OUT1 λ1 | OUT2 λ2 | OUT3 λ3 | OUT4 λ4 |
| IN6 | OUT6 λ6 | OUT7 λ7 | OUT8 λ8 | OUT1 λ1 | OUT2 λ2 | OUT3 λ3 | OUT4 λ4 | OUT5 λ5 |
| IN7 | OUT7 λ7 | OUT8 λ8 | OUT1 λ1 | OUT2 λ2 | OUT3 λ3 | OUT4 λ4 | OUT5 λ5 | OUT6 λ6 |
| IN8 | OUT8 λ8 | OUT1 λ1 | OUT2 λ2 | OUT3 λ3 | OUT4 λ4 | OUT5 λ5 | OUT6 λ6 | OUT7 λ7 |

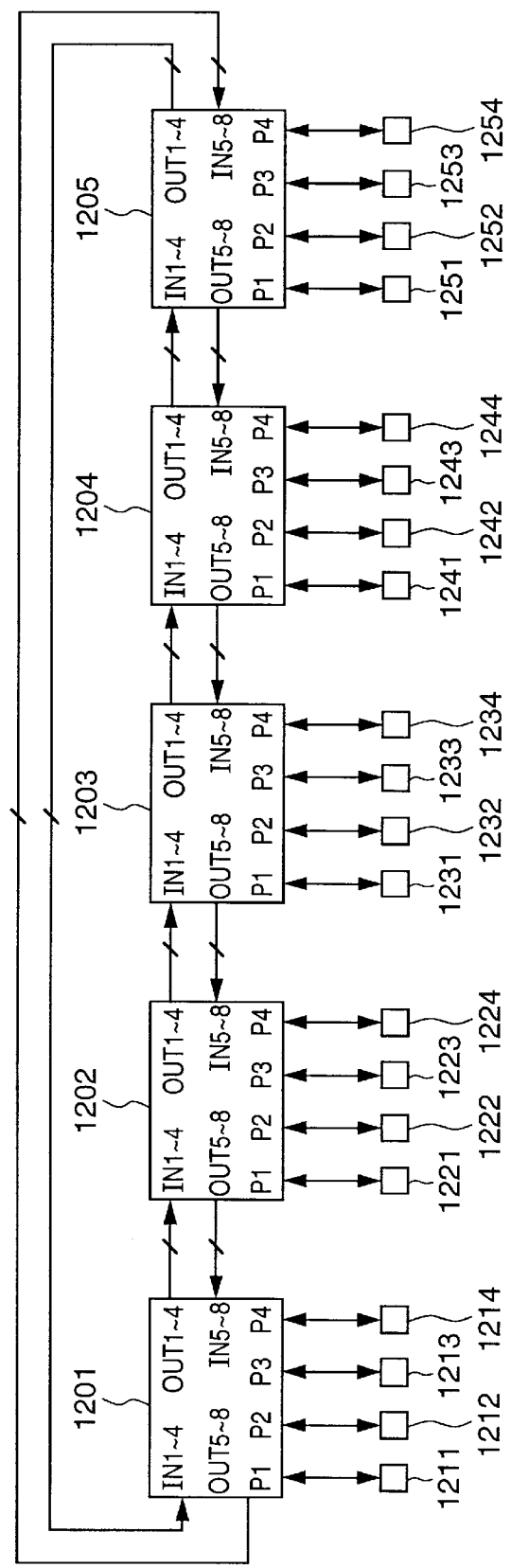

COMMUNICATION APPARATUS, NETWORK SYSTEM USING COMMUNICATION APPARATUS AND CONTROL METHOD USED IN NETWORK SYSTEM

BACKGROUND OF THE INVENTION

1. Field of the Invention

The present invention relates to a communication apparatus such as a node apparatus used for signal transmission and a network system using the apparatus, and a signal control method used in the network system, and more particularly, to a communication apparatus such as a node apparatus which constructs a network in a flexible manner and selects a transmission direction in a flexible manner, and corrects faults occurred in the network.

2. Description of Related Art

In recent years, a signal transmission construction using a plurality of channels has been studied to realize a high-speed and large capacity network connecting terminal devices. For example, Japanese Patent Application Laid-Open Nos. 8-172394, 8-237306 and 9-55758 disclose a transmission construction using a plurality of channels.

Prior to the explanation of the present invention, an example using a part of the construction disclosed in Japanese Patent Application Laid-Open No. 8-237306 will be described below.

FIG. 5 is a block diagram showing the construction of a node apparatus in a network of the example. The node apparatus is connected to terminals 551 to 558 via sub transmission paths. Reference numerals 501 to 508 denote separation inserting units as separation inserting means having a function for detecting an address of a packet inputted from parallel multiplex transmission paths and separating the packet into a packet to be transmitted to a terminal via a subtransmission path and a packet to be inputted into a buffer, and a function for inserting the packet transmitted from a terminal into a packet stream inputted from the parallel multiplex transmission paths. Numerals 511 to 518 denote buffers as buffer means having a function for temporarily storing a packet outputted from the separation inserting unit into a storage area corresponding to an output terminal of a switch 541. Numerals 521 to 528 and numerals 531 to 538 denote the parallel multiplex transmission paths of a plurality of channels for connecting nodes. The transmission paths are, e.g., a plurality of spatially separated optical fiber transmission paths or a wavelength multiplex transmission path wavelength-divided and multiplexed on one optical fiber. Numeral 541 denotes the switch, controlled by a switch controller 542, to connect a packet inputted into one of input terminals IN1 to IN8 to arbitrary one of output terminals OUT1 to OUT8. The switch 541 performs switching by using spatial switches when the parallel multiplex transmission paths are a plurality of optical fiber transmission paths. Further, when a wavelength multiplex transmission path is used, the switch is constructed between the nodes by connecting a transmission unit, comprising a plurality of variable-wavelength laser diodes and a wave combiner, to the wavelength multiplex transmission path such that a receiving unit of the wavelength multiplex transmission paths separates the respective wavelengths by using a wave separator, and the switching is performed by arbitrarily setting transmission wavelengths of the variable-wavelength laser diodes within a range of λ1 to λ8. The switching in this case is performed by an arrangement a little different from the arrangement as shown in FIG. 5. Numeral 542 denotes the switch controller which controls the switch in accordance with, for example, a control pattern in FIG. 4. Numeral 543 denotes a buffer controller. When the input terminals of the switches connected to the respective buffers are connected to desired output terminals, the buffer controller 543 read stored packets from the buffers.

FIG. 4 shows the control pattern indicative of the input-output connection relation of the switch 54 changed by control addresses A1 to A8. The input terminals IN1 to IN8 correspond to the buffers 511 to 518, and the output terminals OUT1 to OUT8 (or transmission wavelengths λ1 to λ8), to storage areas 1 to 8 of the respective buffers.

FIG. 6 shows an example of the construction of a network using the node apparatus in FIG. 5. In the system, four node apparatuses 601 to 604 are connected in a ring type construction with parallel multiplex transmission paths 605 to 608. The respective node apparatuses are connected to eight terminals 611 to 618 via eight subtransmission paths. The terminals 611 to 618 correspond to the terminals 551 to 558, and similarly, terminals 621 to 628, terminals 631 to 638, and terminals 641 to 648, to the terminals 551 to 558.

FIG. 7 is a block diagram for explaining the communication principle of this network. Numeral 701 to 704 denote node apparatuses; 705 to 708, switches corresponding to the switch 541; 709 to 712, buffers corresponding to the buffers 511 to 518; 721 to 736, terminals; and A to D, ring-shaped parallel transmission paths.

First, the communication principle of the network will be described with reference to FIG. 7. This network has the plurality of rings A to D, interconnected by the switches 705 to 709. The respective terminals are connected to one of ring transmission paths A to D. Upon communication with another terminal connected to another ring transmission path, the ring of the terminal is switched to the other ring by an arbitrary switch at least once. The position of switching is not specified, however, if the transmission path is switched to the destination transmission path at a node prior to the destination node, and at another node, the transmission path is switched to an arbitrary path, the communication control is easily made. In the network, in order to simplify the node apparatus, the switches 705 to 708 change the input-output connection relation in accordance with a specific circular pattern at predetermined periods regardless of input signals. The input signals are temporarily stored at the buffers 709 to 712. When the input-output connection relation of the switches becomes a desired relation, the packets are read from the buffer.

For example, if the terminal 722 performs communication with the terminal 732, a packet outputted from the terminal 722 is stored into the buffer 709 of the node 701, and when the input terminal IN3 is connected to the output terminal OUT2 in the switch 705, the packet is read from the buffer to the transmission path B. The packet is inputted into the buffer 710 of the node 702, and when the input terminal IN2 and the output terminal OUT4 of the switch 706 are connected, the packet is read from the buffer 710 to the transmission path D. Then, the packet is sent to the terminal 732.

In this manner, communication is performed by switching to an arbitrary ring in the respective node apparatuses.

Next, the details will be described with reference to FIGS. 5 and 6. In the explanation, the parallel multiplex transmission paths are a plurality of spatially separated optical fiber transmission paths. The switch is a spatial switch. In use of wavelength multiplex transmission path, as the communication is based on the above principle, substantially the same operation is performed. Next, an operation example where communication is performed between the terminals 612 and 635 will be described Transmission data from the terminal 612 is divided into fixed-length packets. Then, a destination address is written in the header of each packet, and the packet is outputted. The output packet is inputted through the sub transmission path into the node apparatus 601, and inserted into a gap in a packet stream from the parallel multiplex transmission path 521 by the separation inserting unit 502, and sent to the buffer 512. In the buffer 512, as the destination address of the input packet does not coincide with a pre-stored address of an adjacent downstream node apparatus, the packet is stored into an arbitrary storage area. In this example, the packet is stored in the storage area 1. The buffer controller 543 controls reading of the packet to be suspended until the input terminal IN2 is connected to the output terminal OUT1 in the switch 541, and when the terminals are connected, reads the packet. The switch controller 542 sequentially supplies control addresses A1 to A8 as shown in a table of FIG. 4, to change the connection relation of the switch 541, thus controls the control pattern to be repeated at 8-packet periods by supplying the control addresses at, e.g., one-packet periods. The information on the control address pattern is notified to the buffer controller 543 to control the timing of reading from the buffer. In this example, when the input terminal IN2 is connected to the output terminal OUT1 in the switch 541, the packet is read from the storage area 1 of the buffer 512, and the packet is outputted through the switch 541 to the transmission path 531. The packet transmitted via the transmission path 531 is inputted into the node apparatus 602, and inputted through the separation inserting unit 501 into the buffer 511. In the buffer 511, as the destination address detected from the header coincides with the address of an adjacent downstream node apparatus, a storage area is designated in correspondence with a transmission path connected to the terminal of the destination address. In this example, as the destination terminal is connected to the transmission path 535, the packet is stored into the storage area 5. When the input terminal IN1 is connected to the output terminal OUT 5 in the switch 541, the buffer controller 543 reads the packet from the storage area 5 of the buffer 511 to the transmission path 535 through the switch 541. Then, the packet is inputted through the transmission path into the separation inserting unit 505 of the node apparatus 603. As the destination address is that of the terminal connected to the separation inserting unit 505, the packet is separated from the transmission path and outputted into a direction for the terminal. The packet outputted from the separation inserting unit 505 is sent through the submission transmission path to the terminal 635, and received there.

Further, Japanese Patent Application Laid-open No. 9-261259 discloses connecting node apparatuses to bi-directional (in first and second directions) transmission paths, and outputting a packet received from a transmission path in the first direction to a transmission path in the second direction.

However, in the above node apparatus, when the transmission path for the packet is changed from a channel in the first direction to a channel in the second direction, the packet from the channel in the first direction is transmitted only to a specific channel in the second direction.

That is, the direction of the transmission paths is changed by transmitting the packet to a channel in the second direction corresponding to a channel in the first direction, e.g., from a first channel in the first direction to a first channel in the second direction, from a second channel in the first direction to a second channel in the second direction, from a third channel in the first direction to a third channel in the second channel.

Further, Japanese Patent Application Laid-Open No. 9-121229 discloses connecting node apparatuses to bi-directional (in first and second directions) transmission paths and outputting only a packet received from a specific channel in the first direction to a specific channel in the second direction.

SUMMARY OF THE INVENTION

The present invention has its object to provide a node apparatus which constructs a network in a more flexible manner.

Further, another object of the present invention is to enable selection of signal transmission channel even if the direction of signal transmission is changed.

Further, another object of the present invention is to facilitate additional installation of a node apparatus.

Further, another object of the present invention is to easily realize divisional use of a network constructed with a plurality of node apparatuses or to easily correct a fault occurred in the network.

Further, another object of the present invention is to transmit control information which is sent to an adjacent upstream node apparatus, upon detection of an fault in the network or upon traffic control, without sending the information around a ring network.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a table showing a switch control method according to the embodiment of the present invention;

FIG. 4 is a table showing the switch control method of the example using a part of the conventional construction;

FIG. 12 is a block diagram showing the construction of the network according to the seventh embodiment of the present invention.

DETAILED DESCRIPTION OF THE PREFERRED EMBODIMENTS

[First Embodiment]

A first embodiment of the present invention will be described.

Figure 1:
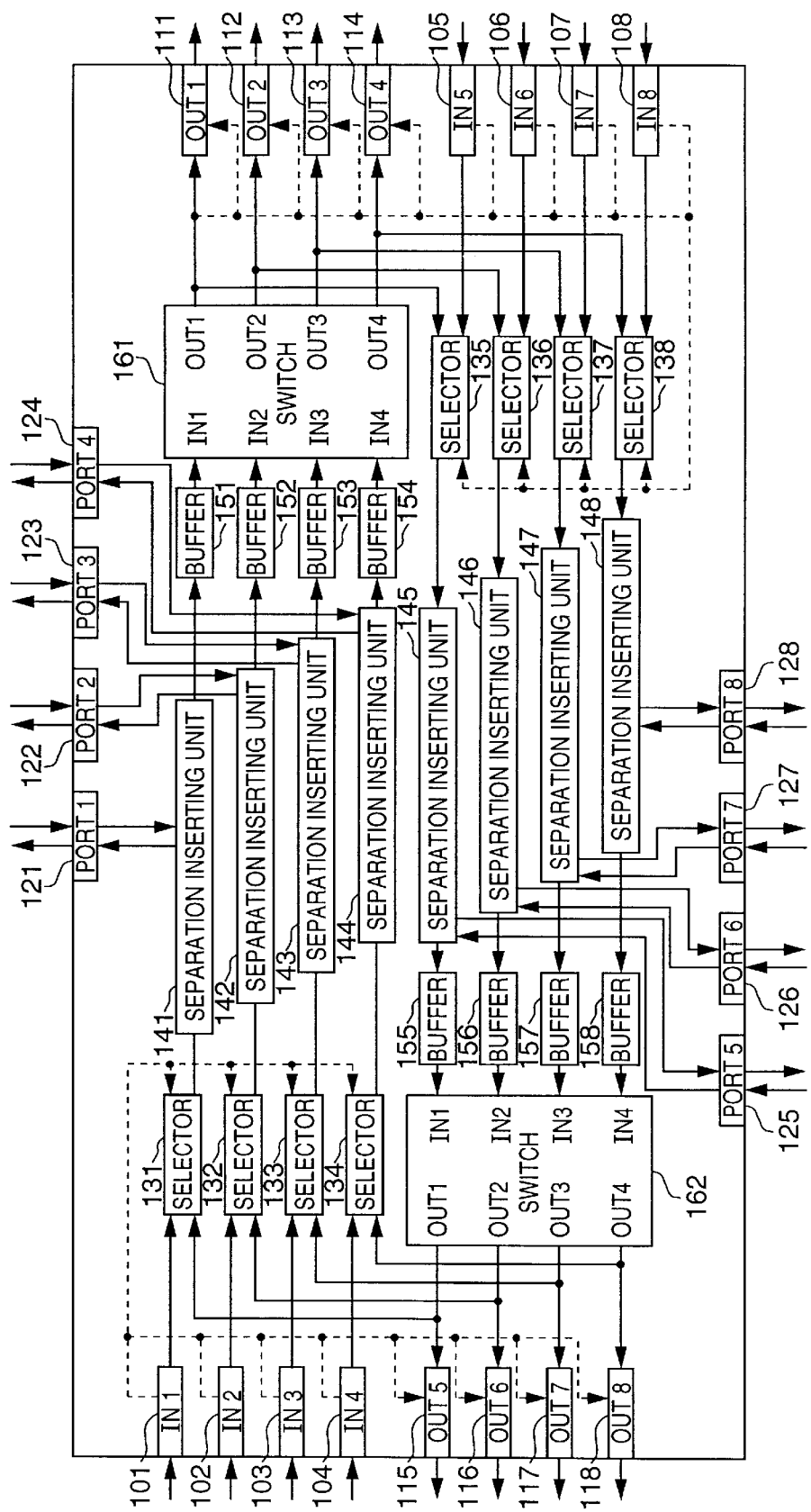
FIG. 1 is a block diagram showing the construction of a node apparatus according to an embodiment of the present invention.

FIG. 1 shows the construction of a node apparatus used in a network according to the present invention. The node apparatus comprises input/output ports PORT1 to PORT 8 for connection with eight terminals via transmission paths such as twisted pair cables, eight input terminals IN1 to IN8 and eight output terminals OUT1 to OUT8 for connection with other node apparatuses via parallel multiplex transmission paths such as multiple core optical fiber cables. In FIG. 1, numerals 101 to 108 denote the input terminals IN1 to IN8 for inputting a signal from the parallel multiplex transmission paths. The input terminals respectively include a photoreceptor or the like to convert an optical signal into an electric signal. Numeral 111 to 118 denote the output terminals OUT1 to 0UT8 for outputting a signal to the parallel multiplex transmission paths. The output terminals respectively include a phototransmitter or the like to convert an electric signal into an optical signal. Numeral 121 to 128 denote the input/output ports PORT1 to PORT8 for connection with a terminal via a twisted pair cable or the like. Numerals 131 to 138 denote 2-input 1-output selectors for selecting a signal from the input terminals IN1 to IN8 or an output signal from switches 161 and 162 and outputting the selected signal. Numerals 141 to 148 denote separation inserting units respectively comprising a separator to separate a packet, to be sent to a terminal, from a packet stream transmitted from a parallel multiplex transmission path and an inserting device to insert the packet sent from the terminal into the packet stream. The separation inserting units 141 to 148 detect the address of a packet from the selectors 131 to 138. If the destination of the packet is a terminal connected to one of the separation inserting units, the packet is outputted to the input/output ports 121 to 128, otherwise, outputted to the buffers 151 to 158. Further, the separation inserting units insert a packet from the input/output ports 121 to 128 into a gap in the packet stream from the selectors 131 to 138 so as to output the packet to the buffers 151 to 158. Numerals 151 to 158 denote the buffers, having storage areas separated for destination output terminals, for temporarily storing input data. Numerals 161 and 162 denote 4×4 switches for connecting a signal inputted from an input terminal to an arbitrary output terminal.

Figure 2:
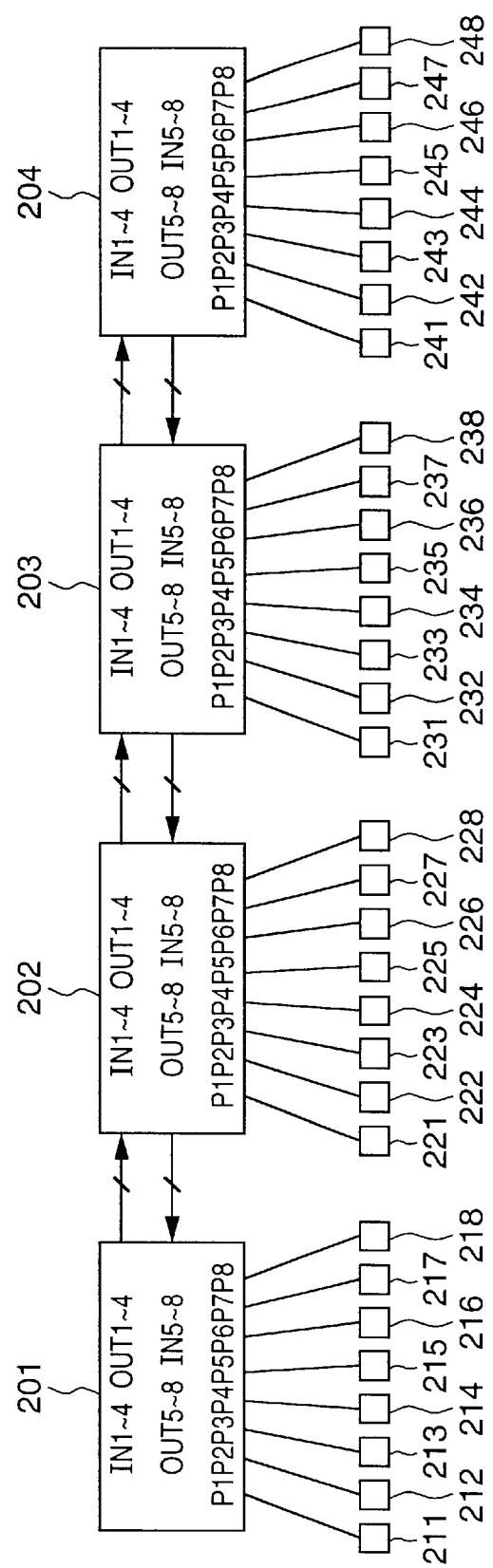
FIG. 2 is a block diagram showing the construction of a network according to the embodiment of the present invention.
Figure 5:
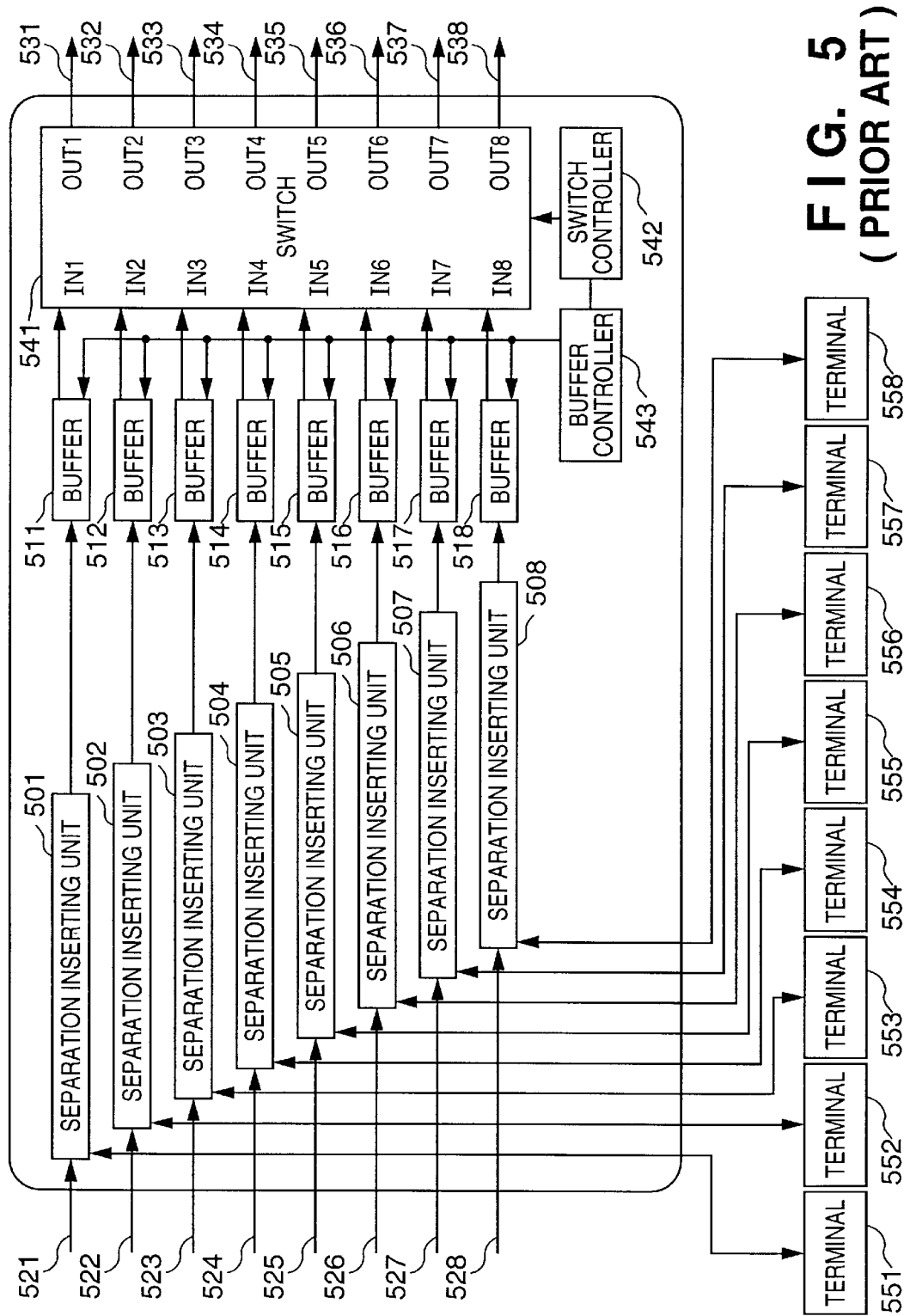
FIG. 5 is a block diagram showing the construction of the node apparatus according to the example.
Figure 6:
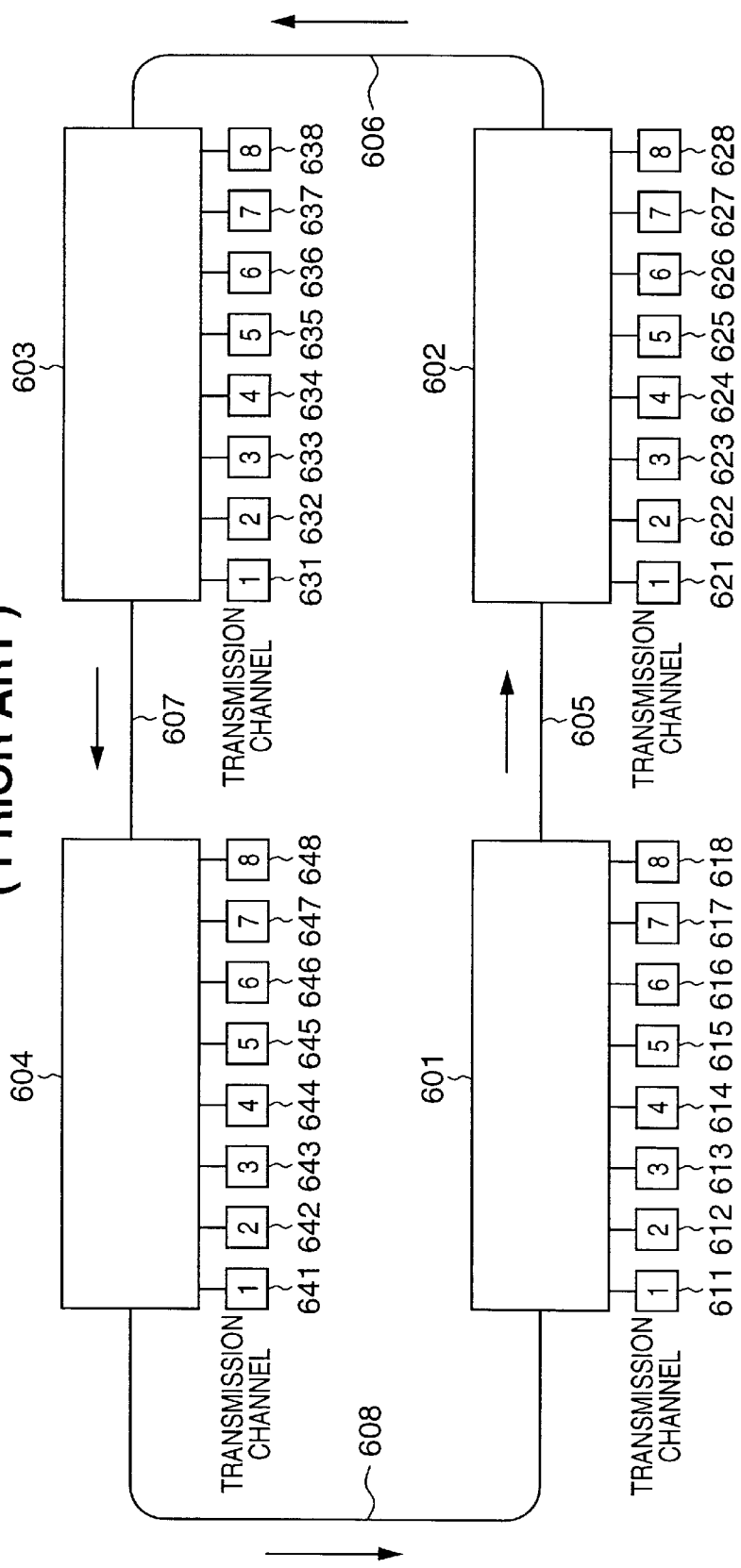
FIG. 6 is a block diagram showing the construction of the network of the example.
Figure 7:
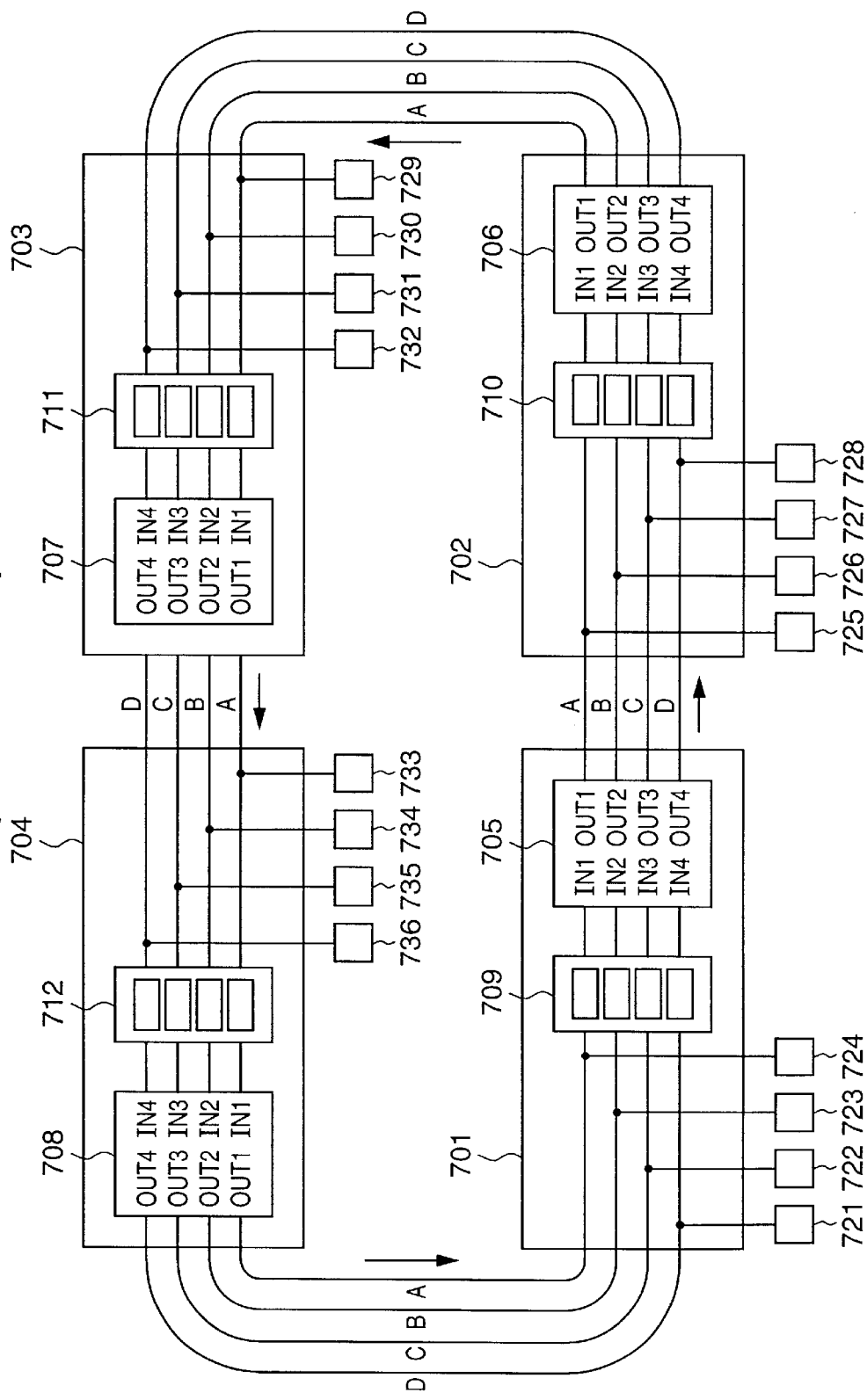
FIG. 7 is a block diagram explaining the communication principle of the network of the example.

FIG. 2 shows the construction of a network using the node apparatus of the present invention. Numerals 201 to 204 denote the node apparatuses of the present invention; and 211 to 248, the terminals. The output terminals OUT1 to OUT4 of each node apparatus are connected to the input terminals IN1 to IN4 of the adjacent node apparatus via the parallel multiplex transmission paths. The output terminals OUT5 to OUT8 of each node apparatus are connected to the input terminals IN5 to IN8 of the adjacent node apparatus via the parallel multiplex transmission paths. The parallel multiplex transmission paths are a plurality of spatially separated optical fiber transmission paths, or a single wavelength-multiplex optical-fiber transmission path. Further, each node apparatus and its terminals are connected with a pair of forward and reverse directional twisted pair cables, optical fiber cables or the like.

In FIG. 2, the input terminals IN1 to IN8 correspond to the input terminals IN1 to IN8 (101 to 108); the output terminals OUT1 to OUT8, to the output terminals OUT1 to OUT8 (111 to 118); and the input/output ports P1 to P8, to the input/output ports PORT1 to PORT8 (121 to 128).

As shown in FIG. 2, as the physical topology of the network, bus type connection is formed with the plurality of bi-directional optical fiber transmission paths, where the connection between each node apparatus and its terminals is in star type connection with twisted pair cables. As the signal topology, multiple ring type connection is formed with a plurality of upstream-to-downstream (201→204) fixed-length packet streams and a plurality of downstream-to-upstream (204→201) fixed-length packet streams turned by node apparatuses at both ends of the network. Further, the network is connected by separate-inserting a packet from/to a terminal into the multiple ring transmission path, thus constructing an ADM (Add Drop Multiplexing) network. Hereinbelow, the detailed communication operation of the network will be described.

First, the signal flow in the network as a ring topology will be described. For convenience of explanation, the upstream-to-downstream (201→4204) signal stream is referred to as a "system 0", while the downstream-to-upstream (204→4201) signal stream is referred to as a "system 1". The photoreceptor provided in the input terminals IN101 to IN108 of each node apparatus monitors the input level of an optical signal and extracts a synchronizing signal, and controls the selectors 131 to 138 based on the obtained information. Generally, when an optical signal is received, the photoreceptor outputs the signal from the input terminal to the separation inserting unit. If the input level is lower than a threshold value or an asynchronous state is detected, the photoreceptor outputs a signal from the switch to the separation inserting unit. Accordingly, in FIG. 2, in the node apparatus 201 at the end of the upstream side, as no optical signal enters the input terminals IN101 to IN104, a signal from the switch 162 is turned through the selectors 131 to 134 to the side of the separation inserting units 141 to 144. That is, a signal transmitted through the system 1 is turned to the system 0 in the node apparatus 201. In the node apparatus 204 at the end of the downstream side, as no optical signal enters the input terminals IN105 to IN108, a signal from the switch 161 is turned through the selectors 135 to 138 to the separation inserting units 145 to 148. That is, a signal transmitted through the system 0 is turned (looped back) to the system 1 in the node apparatus 204. In the node apparatuses 202 and 203, as an optical signal enters the input terminals IN101 to IN108, an input signal from the system 0 is outputted to the system 0, while an input signal from the system 1 is outputted to the system 1. Thus, the entire network forms a ring type topology.

Next, the communication operation of the present network will be described as an example where communication is made between the terminal 225 connected to the input/output port POR5 of the node apparatus 202 and the terminal 233 connected to the input/output port PORT3 of the node apparatus 203. The terminal 225 divides data to be transmitted into fixed-length packets such as ATM (Asynchronous Transfer Mode) cells. A destination address (destination: node apparatus 203, PORT3) is written in the header of each packet, and the packet is transmitted. The packet is transmitted through the twisted pair cable, and inputted into the input/output port 125. The packet is inserted by the separation inserting unit 145 into a gap in a packet stream from the selector 135, and is temporarily stored in the buffer 155. The buffers 151 to 158 respectively have four destination-designated storage areas (CH1 to CH4) corresponding to the output terminals OUT1 to OUT4 of the switches 161 and 162 and one destination-undesignated storage area. In the buffers, the destination address of an input packet is detected, and if the destination is a terminal connected to the same system (system 0 or 1) in the adjacent downstream node apparatus, the packet is stored into a destination-designated storage area corresponding to the transmission channel (CH1 to CH4) connected to the terminal; otherwise, the packet is stored into the destination-undesignated area. In this case, the destination (destination: node apparatus 203, PORT3) of the packet inputted into the buffer 155 is not a terminal connected to the same system in the adjacent downstream node apparatus. Accordingly, the packet is stored into the destination-undesignated area, and is read by an instruction from a controller (not shown).

The controller periodically controls the input/output connection relation of the switches 161 and 162 in accordance with a repetitive pattern. The controller reads packets stored in predetermined storage areas of the respective buffers in accordance with the connection relation of the switches. For example, as shown in FIG. 3, when the connection relation of the switches 161 and 162 is at a phase 1 (IN1→OUT1, IN2→OUT2, IN3→OUT3, IN4→OUT4), the relation enters a phase 2 (IN1→OUT2, IN2→OUT3, IN3→OUT4, IN4→OUT1) after a one-packet length period, then enters a phase 3 (IN1→OUT3, IN2→OUT4, IN3→OUT1, IN4→OUT2) after a two-packet length period, then enters a phase 4 (IN1→OUT4, IN2→OUT1, IN3→OUT2, IN4→OUT3) after a three-packet length period, and returns to the phase 1 after a four-packet length period. This pattern is repeated. The phase change period and the repetitive pattern are not limited to the above-described period and pattern, however, the phase change period is set to an integral multiple of the packet length.

When the connection relation is at the phase 1, the controller reads packets from the destination-designated storage area CH1 of the buffers 151 and 155, the destination-designated storage area CH2 of the buffers 152 and 156, the destination-designated storage area CH3 of the buffers 153 and 157, and the destination-designated storage area CH4 of the buffers 154 and 158. When the connection relation is at the phase 2, the controller reads packets from the destination-designated storage area CH2 of the buffers 151 and 155, the destination-designated storage area CH3 of the buffers 152 and 156, the destination-designated storage area CH4 of the buffers 153 and 157, and the destination-designated storage area CH1 of the buffers 154 and 158. When the connection relation is at the phase 3, the controller reads packets from the destination-designated storage area CH3 of the buffers 151 and 155, the destination-designated storage area CH4 of the buffers 152 and 156, the destination-designated storage area CH1 of the buffers 153 and 157, and the destination-designated storage area CH2 of the buffers 154 and 158. When the connection relation is at the phase 4, the controller reads packets from the destination-designated storage area CH4 of the buffers 151 and 155, the destination-designated storage area CH1 of the buffers 152 and 156, the destination-designated storage area CH2 of the buffers 153 and 157, and the destination-designated storage area CH3 of the buffers 154 and 158. At the respective phases, if a packet is not stored in a destination-designated storage area, a packet is read from a destination-undesignated storage area. By this control, a packet for the same system in the adjacent downstream node apparatus is switched to a destination transmission channel through a switch, while a packet for another destination is switched to an available channel.

Accordingly, in this example, the packet stored in the destination-undesignated storage area of the buffer 155 is read at the phase 4 since no packet is stored in the destination-designated storage area CH4 at the phase 4. The packet is transmitted from the input terminal IN1 to the output terminal OUT4 in the switch 162, converted into an optical signal in the output terminal 18, and outputted to the transmission channel CH4 of the parallel multiplex transmission paths.

The packet transmitted from the node apparatus 202 is inputted into the input terminal 108 of the node apparatus 201, then converted into-an-,electric-signal and inputted into the selector 138. The selector 138 selects the signal and outputs the signal to the separation inserting unit 148. The signal is inputted through the separation inserting unit 148 to the buffer 158. Similarly, the packet is stored in a destination-undesignated storage area, then read from the storage area at a phase, and sent, e.g., from the input terminal IN4 to the output terminal OUT1, in the switch 162. The output packet is inputted into the output terminal 115 and the selector 113. As the node apparatus 201 is not connected to the parallel multiplex transmission paths at one end, the signal inputted into the output terminal 115 is lost there, and the signal inputted into the selector 131 is selected, then inputted through the separation inserting unit 141 into the buffer 151. Similarly, the signal is stored into a destination-undesignated storage area, then read at a phase. The signal is inputted from the input terminal IN1 and outputted to the output terminal OUT2, for example, in the switch 161. The output packet is converted into an optical signal in the output terminal 112, and outputted to the transmission channel CH2 of the parallel multiplex transmission paths.

The packet transmitted from the node apparatus 201 is inputted into the input terminal 102 of the node apparatus 202, then converted into an electric signal and inputted into the selector 132. The selector 132 selects the signal and outputs the signal to the separation inserting unit 142. The signal is inputted through the separation inserting unit 142 into the buffer 152. As the destination of the packet is the transmission channel CH3 of the same system in the adjacent downstream apparatus, the packet is stored in the destination-designated storage area CH3 of the buffer 152. The packet is read at the phase 2, and inputted from the input terminal IN2 and outputted to the output terminal OUT3 in the switch 161. The output packet is converted into an optical signal in the output terminal 113, and outputted to the transmission channel CH3 of the parallel multiplex transmission path.

The packet transmitted from the node apparatus 202 is inputted into the input terminal 103 of the node apparatus 203, then converted into an electric signal and inputted into the selector 133. The selector 133 selects the signal and outputs the signal to the separation inserting unit 143. As the destination of the packet is the terminal 233 connected via the transmission path to the separation inserting unit 143, the separation inserting unit 143 separates the packet from the packet stream, and sends the packet to the input/output port PORT3. The packet is transmitted through the twisted pair cable to the terminal 233. The communication is made in this manner.

[Second Embodiment]

Next, a method to solve a fault such as disconnection of the parallel multiplex transmission path in the first embodiment will be described. In the following description, the parallel multiplex transmission path between the node apparatus 202 and the node apparatus 203 is disconnected.

In this case, as no optical signal is inputted from the parallel multiplex transmission paths into the input terminals 101 to 104 of the node apparatus 203, the selectors 131 to 134 select an output signal from the switch 162 as the packet stream in the system 1 and turn (loop back) the signal to the system 0, as described in the first embodiment. At this time, the input terminals 101 to 104 send information indicative of stoppage of optical input to the output terminals 115 and 118 so as to stop transmission of optical signal. When the optical signal from the output terminals 115 to 118 stops, stoppage of optical signal input is detected in the input terminals 105 to 108 of the node apparatus 202. The selectors 135 to 138 of the node apparatus 202 select an output signal from the switch 161 as the packet stream of the system 1, and turn the signal to the system 1. Accordingly, a ring-type signal stream is formed between the node apparatus 201 and the node apparatus 202, and a ring type signal stream is also formed between the node apparatus 203 and the node apparatus 204. Communication is possible between the node apparatuses 201 and 202, and between the node apparatuses 203 and 204. Note that in the buffers of the looped back side node apparatus, the same-system adjacent-downstream node address, used for storing a packet into a destination-designated storage area, is changed. Accordingly, the same-system adjacent-downstream node address in normal operation and a same-system and adjacent-downstream node in fault detected status are stored in advance. When loop-back operation is made, communication can be performed by changing the address with the stored address in fault detected status. For example, an address in normal operation (node apparatus: 203, PORT1–PORT4) as the same-system adjacent-downstream node address, and an address in fault-detected operation (node apparatus: 202, PORT5–PORT8) as the address in fault detected status are stored in the buffers 151 to 154 of the node apparatus 202. Communication is performed by using these addresses in accordance with information from the input terminals 105 to 108.

The faults corrected by the above method are the disconnection of the parallel multiplex transmission path, decrease of optical-transmission output power due to fault of the phototransmitter of the output terminals 111 to 118, occurrence of asynchronous state due to fault of the photoreceptor of the input terminals 101 to 108 and the like. Further, even if faults simultaneously occur at plural points, an operation similar to that described above is made between the points as boundaries.

[Third Embodiment]

Next, the communication operation in a case where only the node apparatus in FIG. 1 is used will be described.

As described in the first embodiment, when the parallel multiplex transmission paths are not connected to the node apparatus, the system 0 is changed to the system 1 or the system 1 is changed to the system 0. Accordingly, if only one node apparatus is used, the selectors 131 to 134 selects a signal from the switch 162, and the selectors 135 to 138 select a signal from the switch 161. Thus, a ring network is formed within the node apparatus.

As an example of the communication operation, signal transmission from a terminal connected to the input/output port 125 to a terminal connected to the input/output port 127 will be described.

The terminal connected to the input/output port 125 divides data to be transmitted into fixed-length packets. A destination address (destination: node apparatus (203), PORT7) is written in the header of each packet, and the packet is transmitted. The packet inputted from the input/output port 125 through the twisted pair cable is inserted by the separation inserting unit 145 into a gap in a packet stream from the selector 135, and stored into a destination-undesignated storage area of the buffer 155. The packet stored in the destination-undesignated storage area of the buffer 155 is read, for example, when there is no data in the destination-designated storage area CH4 at the phase 4. The packet is inputted from the input terminal IN1 and outputted to the output terminal OUT4 in the switch 162. The output packet is inputted into the output terminal 118 and the selector 134. As the output terminal 118 is not connected to the parallel multiplex transmission path, the signal inputted into the output terminal 118 is lost there. The signal inputted into the selector 134 is selected and inputted through the separation inserting unit 144 to the buffer 154.

At this time, an address (destination: node apparatus 202, PORT5 to 8) as the same-system adjacent-downstream node address in fault detected status is stored in the buffer 154. As the address of the input packet coincides with the address in the buffer 154, the packet is stored into the destination-designated storage area CH3 corresponding to the destination terminal. The packet is read at the phase 4, and inputted from the input terminal IN4 and outputted to the output terminal OUT3 in the switch 161. The output packet is inputted through the selector 137 to the separation inserting unit 147. As the destination of the packet is the terminal connected to the separation inserting unit 147 via the transmission path, the separation inserting unit 147 separates the packet from the packet stream and sends the packet to the input/output port PORT7. The packet is transmitted through the twisted pair cable to the terminal. The communication is performed in this manner.

[Fourth Embodiment]

Figure 8:
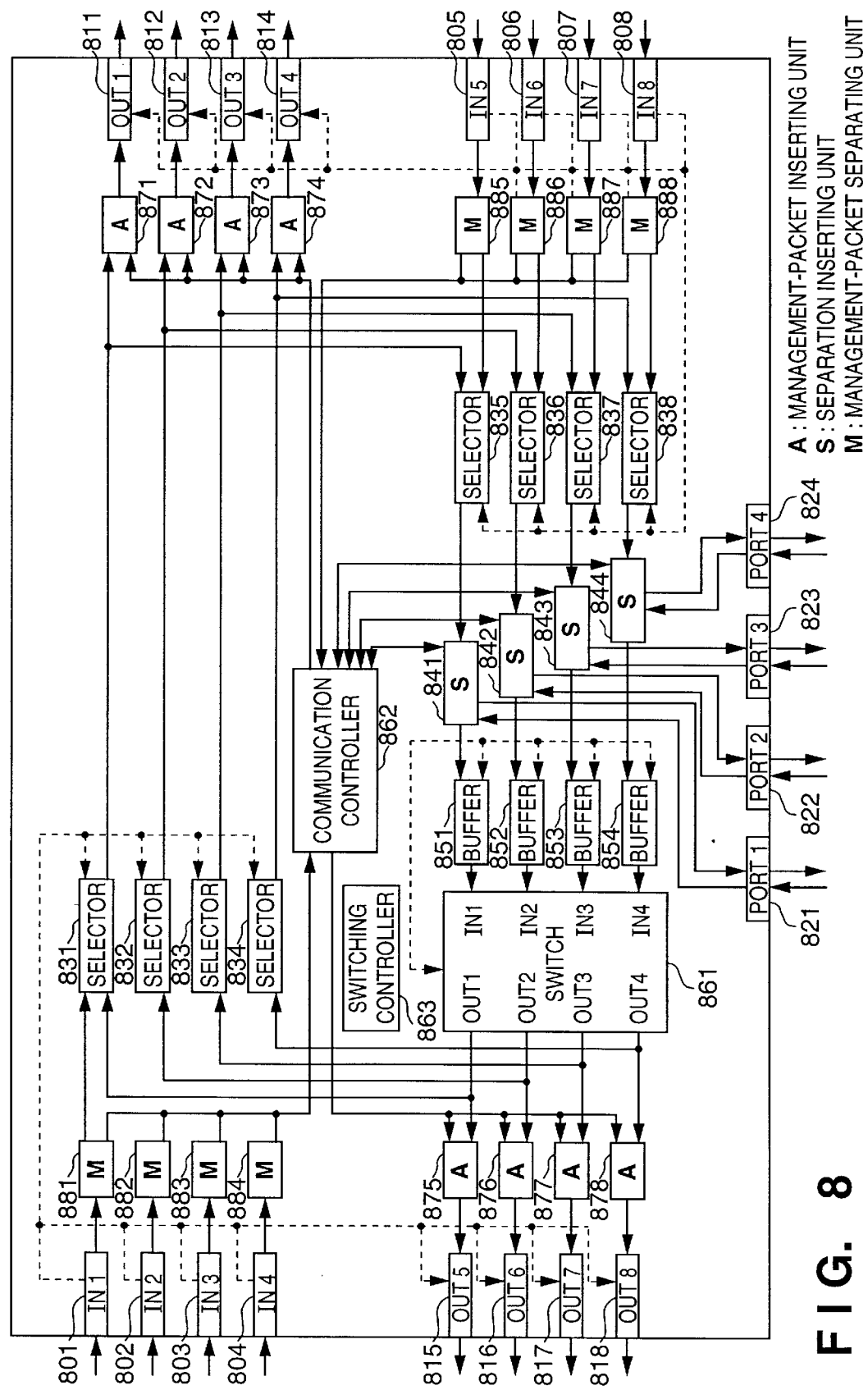
FIG. 8 is a block diagram showing the construction of the node apparatus according to a fourth embodiment of the present invention.

Next, a fourth embodiment of the present invention will be described. In this embodiment, different from the first to third embodiment, the channels for transmission from the left to the right in FIG. 8 are not directly connected to the terminals (subtransmission paths). Further, the network has a double ring construction. Further, a particular signal, especially a management packet in this embodiment, can be turned in transmission.

FIG. 8 shows the construction of the node apparatus used in the network of the present embodiment. The node apparatus comprises input/output ports PORT1 to PORT4 for connection with four terminals via transmission paths such as twisted pair cables, and eight input terminals IN1 to IN8 and eight output terminals OUT1 to OUT8 for interconnecting the node apparatuses of the present embodiment via the parallel transmission path such as multiple-core optical fiber cables.

In FIG. 8, numerals 801 to 808 denote the input terminals IN1 to IN8 for inputting a signal from the parallel transmission paths. The input terminals respectively include a photoreceptor or the like to convert an optical signal into an electric signal. In addition to the photoelectric conversion, the photoreceptor performs clock extraction, decoding of coded signal, and performs AIS (Alarm Indicated Signal) detection and detection of stoppage of optical input as fault detection means. As the fault detection means, first fault detection means is included in the input terminals 805 to 808, and second fault detection means is included in the input terminals 801 to 804.

Numerals 811 to 818 denote the output terminals OUT1 to OUT8 for outputting a signal to the parallel transmission paths. The output terminals respectively include a phototransmitter or the like to convert an electric signal into an optical signal. In addition to the photoelectric conversion, the phototransmitter performs AIS insertion in transmission-path coding and upon detection of fault.

Numerals 821 to 824 denote the input/output ports PORT1 to PORT4 for connection with the terminals via the twisted pair cables or the like. The respective ports comprise a transmission circuit and a reception circuit. Numerals 831 to 834 denote 2-input 1-output selectors as second selection means for selecting a signal from management-packet separating units 881 to 884 or an output signal from the switch 861 and outputting the selected signal. In normal operation, the selectors 831 to 834 select the signal from the management-packet separating units 881 to 884. When an AIS or stoppage of optical input is detected in at least one of the input terminals 801 to 804, the signal from the switch 861 is selected.

Numerals 835 to 838 denote 2-input 1-output selectors as first selection means for selecting a signal from management-packet separating units 885 to 888 or a signal from the selectors 831 to 834 and outputting the selected signal. In normal operation, the selectors 835 to 838 select the signal from the management-packet separating units 885 to 888. When an AIS or stoppage of optical input is detected in at least one of the input terminals 805 to 808, the signal from the selectors 831 to 834 is selected.

Numeral 841 to 844 denote the separation inserting units as separation inserting means for separating a packet, to be transmitted to a terminal, from the packet stream transmitted from the parallel transmission path, and inserting a packet sent from a terminal into the packet stream, further separation-inserting a control packet. The separation inserting units 841 to 844 detect a destination address of a packet from the selectors 835 to 838. If the destination is a terminal connected to a separation inserting unit, the packet is outputted to the input/output ports 821 to 824. If the packet is a control packet for the node apparatus, the packet is outputted to a communication controller 862. If the packet is to be transmitted to another destination, the packet is outputted to the buffers 851 to 854. Further, the separation inserting units 841 to 844 insert a packet from the input/output ports 821 to 824 into a gap in the packet stream from the selectors 835 to 838. If the packet is a data packet, the separation inserting units output the packet to the buffers 851 to 854; if the packet is a control packet for another node apparatus, the separation inserting units output the packet to the buffers 851 to 851; if the packet is a control packet for the node apparatus itself, output the packet to the communication controller 862. Further, the separation inserting units 841 to 844 respectively have a function to inserting a control packet from the communication controller 862 into a gap in a packet stream.

Numerals 851 to 854 denote buffers as buffer means for temporarily storing input data. The buffers 851 to 854 respectively have storage areas in correspondence with output terminals as destinations. More specifically, each buffer area is divided into four destination-designated storage areas (CH1 to CH4) corresponding to the output terminals OUT1 to OUT4 of a switch 861 and one destination-undesignated storage area. When the destination address of an input packet is detected, if the destination is a terminal connected to an adjacent downstream node apparatus, the packet is stored into a destination-designated storage area corresponding to a transmission channel (CH1 to CH4) connected to the terminal, otherwise, the packet is stored into the destination-undesignated storage area.

Numeral 861 denotes a 4×4 switch as switching means for connecting a signal inputted into an input terminal to an arbitrary output terminal. The switch 861 periodically changes input/output connection relation in accordance with a predetermined repetitive pattern under the control of a switching controller 863. For example, when the connection relation of the switches 861 is at a phase 1 (IN1→OUT1, IN2→OUT2, IN3→OUT3, IN4→OUT4), the relation enters a phase 2 (IN1→OUT2, IN2→OUT3, IN3→OUT4, IN4→OUT1) after a one-packet length period, then enters a phase 3 (IN1→OUT3, IN2→OUT4, IN3→OUT1, IN4→OUT2) after a two-packet length period, then enters a phase 4 (IN1→OUT4, IN2→OUT1, IN3→OUT2, IN4→OUT3) after a three-packet length period, and returns to the phase 1 after a four-packet length period. This pattern is repeated. The phase change period and the repetitive pattern are not limited to the above-described period and pattern, however, the phase change period is set to an integral multiple of the packet length.

Numeral 862 denotes the communication controller as communication control means for performing composition/decomposition of management packet and composition/decomposition of control packet. The communication controller 862 performs communication between the node apparatuses (using a management packet and a control packet) and communication between a node apparatus and a terminal (using a control packet).

Numeral 863 denotes the switching controller as switching control means for controlling connection in the switch 861 and reading from the buffers 851 and 854.

The connection control method of the switch 861 is made as follows.

In the buffer reading control, when the connection relation is at the phase 1, the switching controller reads packets from the destination-designated storage area CHi of the buffer 851, the destination-designated storage area CH2 of the buffer 85 2, the destination-designated storage area CH3 of the buffer 853, and the destination-designated storage area CH4 of the buffer 854. When the connection relation is at the phase 2, the controller reads packets from the destination-designated storage area CH2 of the buffer 851, the destination-designated storage area CH3 of the buffer 852, the destination-designated storage area CH4 of the buffer 853, and the destination-designated storage area CHi of the buffer 854. When the connection relation is at the phase 3, the controller reads packets from the destination-designated storage area CH3 of the buffer 851, the destination-designated storage area CH4 of the buffer 852, the destination-designated storage area CH1 of the buffer 853, and the destination-designated storage area CH2 of the buffer 854. When the connection relation is at the phase 4, the controller reads packets from the destination-designated storage area CH4 of the buffer 851, the destination-designated storage area CH1 of the buffer 852, the destination-designated storage area CH2 of the buffer 853, and the destination-designated storage area CH3 of the buffer 854. At the respective phases, if a packet is not stored in a destination-designated storage area, a packet is read from a destination-undesignated storage area.

The management packet is a packet for transmitting a physical-layer management information of the network. The management packet is formed by using management information, and the packet is transmitted, periodically or in accordance with necessity. The communication controller 862 decomposes the sent management packet, takes the management information and uses it for node apparatus management. The management packet is transmitted to all the transmission channels between adjacent node apparatuses and managed. The management packet includes information indicating that the packet is a management packet in its header, and is discriminated from the control packet.

The control packet is mainly used for transmitting information such as information upon connection establishment used in an upper layer. The control packet is transmitted/received between a terminal and a node apparatus or between arbitrary node apparatuses. The control packet includes information indicating that the packet is a control packet in its header, and is discriminated from the data packet and management packet.

When a node apparatus detects a fault, the AIS signal is used to inform the adjacent node apparatus of the detection of the fault. A signal from an output terminal is forcibly converted into an AIS signal (e.g., all "1" signal). When the AIS signal is detected, fault correction operation such as loop-back operation is performed.

Numerals 871 to 878 denote management-packet inserting units as management-packet inserting means for inserting a management packet composed by the communication controller 862 into a packet stream.

Numerals 881 to 888 denote management-packet separating units as management-packet separating means for separating a management packet from a transmission path and forwarding the management information to the communication controller 862.

Figure 9:
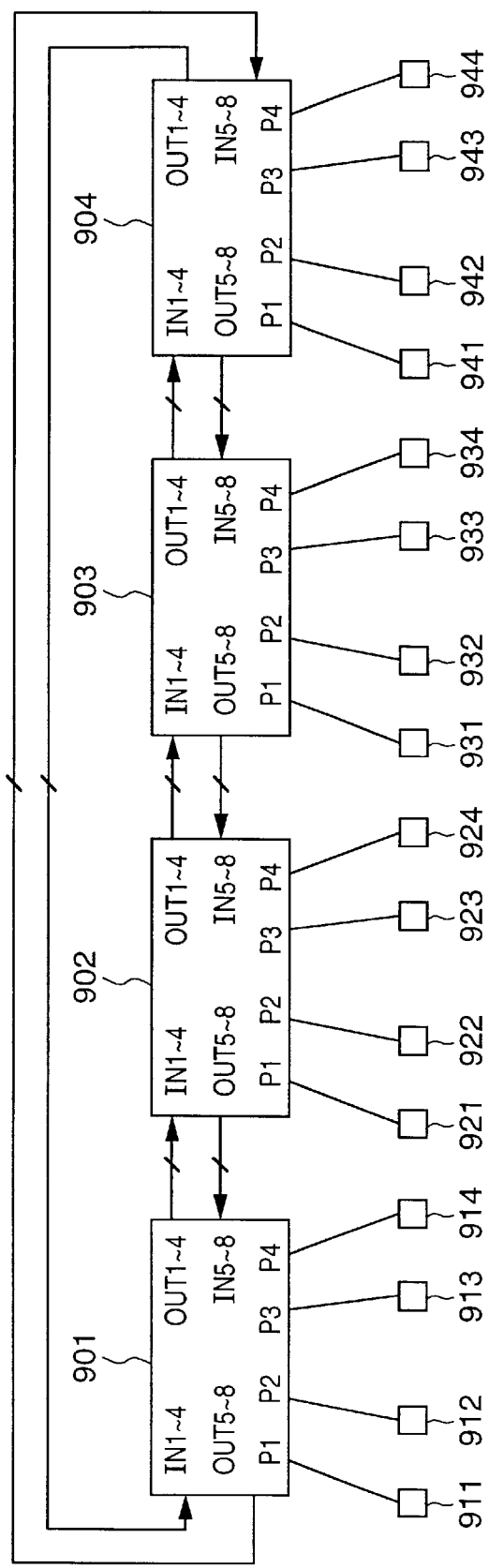
FIG. 9 is a block diagram showing the construction of the network according to the fourth embodiment of the present invention.

FIG. 9 shows an example of the construction of the network using the node apparatus according to the present embodiment. Numerals 901 to 904 denote the node apparatuses of the present embodiment; and 911 to 914, 921–924, 931–934 and 941 to 944, the terminals. The output terminals OUT1 to OUT4 of each node apparatus are connected to the input terminals IN1 to IN4 of the adjacent node apparatus with a second parallel transmission path, and the output terminals OUT5 to OUT8 of each node apparatus are connected to the input terminals IN5 to IN8 of the adjacent node apparatus with a first parallel transmission path, thus constructing a double-ring type network. The input terminals IN1 to IN8 correspond to the input terminals IN1 to IN8 (801 to 808) in FIG. 8; the output terminals OUT1 to OUT8, to the output terminals OUT1 to OUT8 (811 to 818) in FIG. 8, and ports P1 to P4, to the port PORT1 to PORT4 (821 to 824) in FIG. 8.

The parallel transmission paths connecting the node apparatuses are a plurality of spatially-separated optical fiber transmission paths, or a single wavelength-multiplex optical fiber transmission path, for example. In the present embodiment, the parallel transmission paths include four upstream channels and four downstream channels, however, the number of channels is not limited to this arrangement. Further, in the present embodiment, only data signals are transmitted via the parallel transmission paths, however, a channel for transmitting a clock may be provided.

Each node apparatus is connected to its terminals with a pair of upstream and downstream twisted pair cables, optical fiber cables or the like.

In the present network, in normal operation, a clockwise ring (system 0) is used for communication; in fault detected status, the loop-back operation is performed within the node apparatus, to form one ring with the system 0 and a counterclockwise ring (system 1), and communication is performed. The system 0 in FIG. 8 is a route from the input terminals 805 to 808 through the management-packet separating units 885 to 888, the selectors 835 to 838, the separation inserting units 841 to 844, the buffers 851 to 854, the switch 861, the management-packet inserting units 875 to 878, to the output terminals 815 to 818. The system 1 in FIG. 8 is a route from the input terminals 801 to 804 through the management-packet separating units 881 to 884, the selectors 831 to 834, the management-packet inserting units 871 to 874, and the output terminals 811 to 814. These systems are switched by the selectors 831 to 838 upon detection of stoppage of optical input or detection of AIS signal in the input terminals 801 to 808.

First, the communication operation using a data signal will be described as an example where communication is performed between the terminal 921 and the terminal 933. As the respective node apparatuses 901 to 904 respectively have a function to switch a received packet to an arbitrary one of transmission channels CHi to CH4, a packet outputted from the terminal 921 and inserted into the transmission channel CH1 is merely switched to the destination transmission channel CH3 in the node apparatus 901 or 904. To facilitate the communication control, the packet is switched to an available transmission channel in node apparatuses other than the destination node apparatus, then the packet is switched to the destination transmission channel in the node apparatus precedent to the destination node apparatus. That is, the packet inserted into the transmission channel CH1 in the node apparatus 902 is switched to an available transmission channel in the node apparatus 901, however, in the node apparatus 904, the packet is switched to the destination transmission channel CH3, and in the node apparatus 903, the packet is separated from the transmission channel CH3 and sent to the terminal 933.

The switching within the node apparatus is made by reading the packet at predetermined timing from the storage area of the buffers 815 to 854 with respect to the switch 861 with circularly changing connection relation according to a predetermined repetitive pattern. That is, in switching to a designated destination, the packet is temporarily stored in a destination-designated storage area corresponding to the destination transmission channel of the buffers, and the packet is read at a phase providing appropriate connection relation as shown in FIG. 3. Thus, the packet is switched to the destination transmission channel through the switch 861. For example, when the packet is switched from the transmission channel CH1 to the transmission channel CH3, the packet is temporarily stored in the storage area CH3 of the buffer 851 connected to the transmission channel CH1, and at the phase 3 where the input terminal IN1 is connected to the output terminal OUT3 in the switch 861, the packet is read from the storage area CH3 of the buffer 851. Thus, the packet is switched to the destination transmission channel. If switching is not required, the packet is stored in the destination-undesignated storage area, and at a phase where no packet is stored in a corresponding destination-designated storage area, the packet is read from the destination-undesignated storage area. Thus, the packet is switched to an available transmission channel.

Hereinbelow, the communication operation will be described in detail.

The terminal 921 divides data to be transmitted into fixed-length packets such as ATM (Asynchronous Transfer Mode) cells. A destination address (destination: node apparatus 903, PORT3) is written in the header of each packet, and the packet is transmitted. The packet transmitted through the twisted pair cable and inputted from the input/output port 821 is inserted by the separation inserting unit 841 into a gap in a packet stream from the selector 835, and is temporarily stored in the buffer 851. As the destination address (destination: node apparatus 903, PORT3) of the input packet is not a terminal in the adjacent downstream node apparatus, the packet is stored in the destination-undesignated storage area, and read by an instruction from the switching controller 863. In this example, the packet is read at the phase 4 since no packet is stored in the destination-designated storage area CH4, and inputted from the input terminal INI and outputted to the output terminal OUT4 in the switch 861. The packet is inputted into the management-packet inserting unit 878 and the selector 834. As the selectors 831 to 834 do not select a signal from the switch 861 in normal operation, the signal inputted into the selector 834 is lost there. The management-packet inserting unit 878, which inserts a management packet into a gap of the packet stream periodically or in accordance with necessity, outputs the input packet with a management packet to the output terminal 818. In the output terminal 818, transmission-path coding and photoelectric conversion are performed, and the packet is outputted to the transmission channel CH4 of the parallel transmission paths.

The packet transmitted from the node apparatus 902 is inputted into the input terminal 808 of the node apparatus 901, then photoelectric-converted and decoded, and inputted into the management-packet separating unit 888. The management-packet separating unit 888 separates the management packet from the packet stream and sends the packet to the communication controller 862, and outputs the other packet to the selector 838. The packet is selected by the selector 838 and is inputted through the separation inserting unit 844 into the buffer 854. Also, the packet is stored into the destination-undesignated storage area, and is read at a phase. The packet is inputted from the input terminal IN4 and outputted to the output terminal OUT2, for example, in the switch 861. The output packet is converted into an optical signal in the output terminal 816, and outputted to the transmission channel CH2 of the parallel transmission paths.

The packet transmitted from the node apparatus 901 is inputted into the input terminal 805 of the node apparatus 904, then converted into an electric signal, and inputted into the selector 836. The selector 836 selects the signal and outputs the signal to the separation inserting unit 842. The signal is inputted through the separation inserting unit 842 into the buffer 852. As the destination of the packet is the terminal connected to the transmission channel CH3 of the adjacent downstream node apparatus, the packet is stored into the destination-designated storage area CH3 of the buffer 852. The packet is read at the phase 2, and inputted from the input terminal IN2 and outputted to the output terminal OUT3 in the switch 861. The output packet is inputted through the management-packet inserting unit 877 into the output terminal 817. The packet is converted into an optical signal in the output terminal 817, and outputted to the transmission channel CH3 of the parallel transmission paths.

The packet transmitted from the node apparatus 904 is inputted into the input terminal 807 of the node apparatus 903, then converted into an electric signal, and inputted through the management-packet separating unit 887 into the selector 837. The selector 837 selects the signal and outputs the signal to the separation inserting unit 843. As the destination of the packet is the terminal 933 connected to the separation inserting unit 843 via the transmission path, the separation inserting unit 843 separates the packet from the packet stream and sends the packet to the input/output port PORT3. The packet is transmitted trough the twisted pair cable to the terminal 933. In this manner, the communication is made.

Next, the communication operation using a management packet will be described. The management packet, which is used for transmitting the physical layer management information of the network as described above, includes fault information, traffic management information, error monitoring information and the like. Such information is especially required by a node apparatus that detected the information and the adjacent upstream node apparatus for network management. For example, if error occurrence frequency has increased, it is necessary to determine whether the errors occurred due to the node apparatus that detected the fault information or the adjacent upstream node apparatus. Further, as abnormality in the physical layer may influence the entire network, any operation must be immediately made to solve the abnormality. Accordingly, in the present network, when a node apparatus sends fault information to the adjacent upstream node apparatus, the system 1 is employed to transmit the management information. At this time, the system 0 for transmitting information around the connection ring is not employed.

The transmission of error monitoring information will be described. The communication controller 862 inserts an error detection code into four management packets and sends the packets to the management-packet inserting units 875 to 878. The management packets are transmitted from the output terminals 815 to 818 to the parallel transmission path, and inputted into the adjacent downstream node apparatus. The input four management packets are respectively separated from the packet stream by the management-packet separating units 885 to 888, and sent to the communication controller 862. The communication controller 862 calculates the error detection codes of the four management packets. If an error is detected from the management packet from the management-packet separating unit 886, the communication controller 862 writes information indicative of the detection of error, and transmits the packet from the management-packet inserting unit 872. The packet is separated by the management-packet separating unit 882 of the adjacent node apparatus, and inputted into the communication controller 862. The communication controller 862 is informed of the existence of fault on the transmission line from the output terminal 816, and performs the fault solution operation.

Similarly, other fault information, traffic management information and the like are returned in the form of packets in the system 1 with respect to management packet information sent from the system 0. The network is managed in this manner.

In the above description, the management packet is a packet similar to data packet, however, similar operation can be made by using frame structured data such as SDH (Synchronous Digital Hierarchy) frame.

Next, the communication operation using a control packet will be described. As described above, the control packet, which is used for transmitting information such as control information upon connection establishment mainly used in the upper layer, is transmitted/received between a terminal and a node apparatus or between arbitrary node apparatuses. As an example, the control packet communication operation between the terminal 921 and the terminal 933 upon connection establishment will be described.

The terminal 921 transmits communication-request setup information in the form of packet. The control packet inputted from the input/output port 821 of the node apparatus 902 is temporarily inserted into the packet stream by the separation inserting unit 841, then separated from the packet stream and inputted into the communication controller 862. The communication controller 862 obtains information on communication request, communication capacity and the like, and transmits a control packet as a response through the separation inserting unit 841, the input/output port 821 to the terminal 921. At the same time, the communication controller 862 rewrites the destination of the control packet sent from the terminal 921 to the adjacent node apparatus, and transmits the packet through the separation inserting unit 841 to the buffer 851. The packet is stored into the destination-designated area CH1, and read at the phase 1. The read packet is sent through the input terminal IN1 and the output terminal OUT1 in the switch and the management-packet inserting unit 875, and outputted from the output terminal 815 to the parallel transmission path. The control packet inputted from the input terminal 805 of the node apparatus 901 is sent through the management-packet separating unit 885 and the selector 835, separated from the packet stream by the separation inserting unit 841, and inputted into the communication controller 862. Thus, the node apparatus 901 also obtains the information on the communication request, the communication capacity and the like from the terminal 921. Similarly, the node apparatus 901 transmits the control packet to the node apparatus 904, further, the node apparatus 904 transmits the control packet to the communication controller 862 of the node apparatus 903. In this manner, all the node apparatuses obtain the information on the communication request and the communication capacity from the terminal 921. The communication controller 862 of the node apparatus 903 rewrites the destination of the control packet to the terminal 923, and transmits the control packet, through the separation inserting unit 843 and the input/output port 823, to the terminal 933. When preparation for communication has been completed, the terminal 933 transmits a control packet, through the communication controller 862 of the node apparatus 903 and the communication controller 862 of the node apparatus 902, as described above, to the terminal 921, thus establishing the connection. Thereafter, the above-described data communication is performed, and when the communication has ended, a control packet for disconnection is transmitted. The disconnection operation is made in a similar manner to that of the connection establishment.

Next, the fault solution method upon occurrence of fault such as disconnection of parallel transmission path or the like in the network will be described. In this case, the parallel transmission paths between the node apparatus 902 and the node terminal 903 are disconnected.

In this case, the input terminals 805 to 808 of the node apparatus 902 detect stoppage of optical input. Then, the selectors 835 to 838 select a signal from the selectors 831 to 834, and turn (loop back) the selected signal to the system 0. At this time, the input terminals 805 to 808 sent information on the stoppage of optical input to the output terminals 811 to 814 so as to output an AIS signal. When the AIS signal from the output terminals 815 to 818 is inputted into the input terminals 801 to 804 of the node apparatus 903, the AIS signal is detected, then an output signal from the switch 861 as the system 0 packet stream is selected by the selectors 831 to 834, and the selected signal is turned to the system 1. The system 0 signal outputted from the node apparatus 902 is transmitted through the node apparatuses 901→4 904→903, turned in the node apparatus 903 to the system 1, then transmitted through the node apparatuses 904→901→902, and turned in the node appears 902 to the system 0, thus transmitted around the network. This enables communication.

Further, when stoppage of optical input is detected in the system 1 as a spare system, similar fault correction operation by the loop-back operation may be made, or even if an AIS signal is detected at an input terminal in the system 0, the communication using the system 0 may be continued without using loop-back operation.

[Fifth Embodiment]

Next, the communication operation in use of only one node apparatus in FIG. 8 will be described.

In a case where the parallel transmission paths are not connected to the node apparatus, the respective input terminals 801 to 808 detect stoppage of optical input. Then, the system 0 is changed to the system 1 and the system 1 is changed to the system 0. Accordingly, the selectors 831 to 834 select a signal from the switch 861, and the selectors 835 to 838 select a signal from the selectors 831 to 834, thus constructing a ring network within the node apparatus.

As an example of the communication operation, signal transmission from a terminal connected to the input/output port 824 to a terminal connected to the input/output port 823 will be described.

The terminal connected to the input/output port 824 divides data to be transmitted into fixed-length packets. A destination address (destination: node apparatus (903), PORT3) is written in the header of each packet, and the packet is transmitted. The packet transmitted through the twisted pair cable is inputted from the input/output port 824, then inserted by the separation inserting unit 844 into a gap of a packet stream from the selector 838, and inputted into the buffer 854. At this time, an address (destination: node apparatus (903), PORT1–PORT4), as the adjacent downstream node apparatus address used in communication within the single node apparatus, is stored in the buffer 854. As the destination address of the input packet coincides with the stored address, the packet is stored into the destination-designated storage area CH3 corresponding to the destination. The packet is read at the phase 4, then inputted from the input terminal IN4 and outputted to the output terminal OUT3. in the switch 861. The output packet is sent through the selector 833 and the selector 837, and inputted into the separation inserting unit 843. As the destination of the packet is the terminal 923 connected to the separation inserting unit 843 via the transmission path, the separation inserting unit 843 separates the packet from the packet stream and sends the packet to the input/output port PORT3. Then the packet is transmitted through the twisted pair cable to the terminal 923. The communication is made in this manner.

[Sixth Embodiment]

Figure 10:
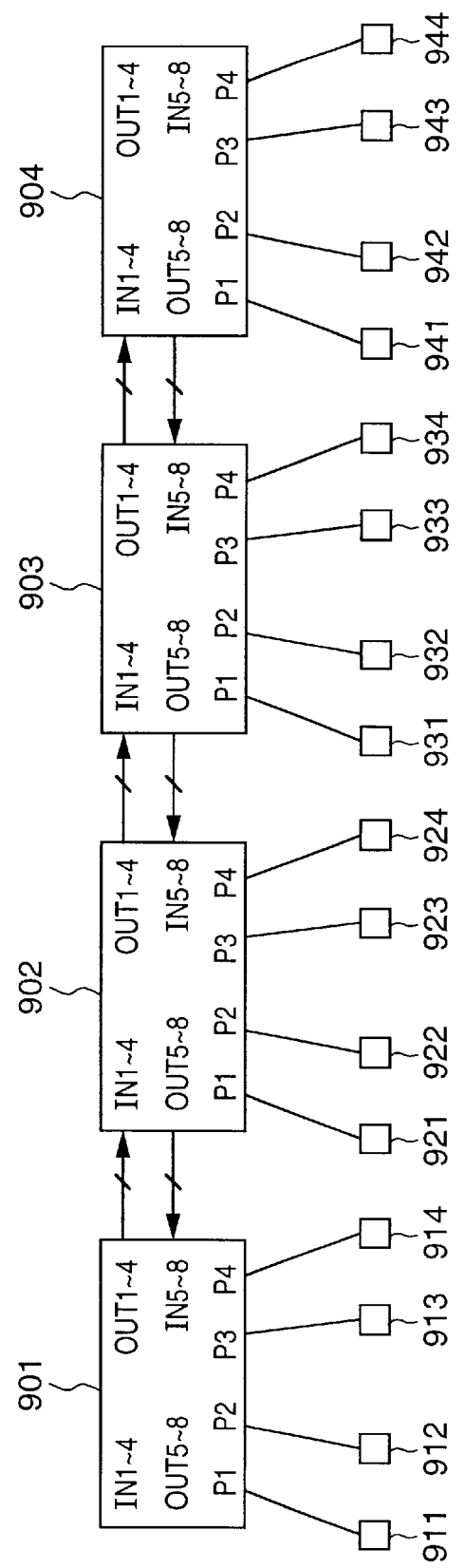
FIG. 10 is a block diagram showing the construction of the network according to a sixth embodiment of the present invention.

FIG. 10 shows another network construction using the node apparatus in FIG. 8. The difference from the fourth embodiment is that the node apparatuses are not connected in the double-ring construction but in a bus-type construction where a logical single-ring construction is realized by loop-back operation by the apparatuses at the both ends. Further, as the network does not have a spare system, signals are also transmitted in a system corresponding to the system 1 of the fourth embodiment.

Hereinbelow, the communication operation of the network will be described. As described above, the node apparatuses 901 and 904 detect stoppage of optical input in the input terminals not connected to the parallel transmission paths, and perform the loop-back operation. For example, a signal outputted to a terminal connected to the node apparatus 902 is transmitted from the node apparatus 902 to the node apparatus 901, then looped back and transmitted through the node apparatuses 901→902→903→904, further, turned in the node apparatus 904 and transmitted through the node apparatuses 904→903→902. In this manner, the signal is transmitted around. the network, to the terminal. The communication is made in this manner.

Next, the fault correction operation upon occurrence of fault such as disconnection of parallel transmission path or the like in this network will be described. In this example, the parallel transmission paths in the system 0 between the node apparatus 902 and the node apparatus 903 are disconnected.

In this case, the input terminals 805 to 808 of the node apparatus 902 detect stoppage of optical input, then the selectors 835 to 838 select a signal from the selectors 831 to 834 and turn (loop back) the signal to the system 0. At this time, the input terminals 805 to 808 send information on the stoppage of optical input to the output terminals 811 to 814 so as to output an AIS signal. The AIS signal from the output terminals 811 to 814 is inputted into the input terminals 801 to 804 of the node apparatus 903. The signal is detected, then the selectors 831 to 834 select an output signal from the switch 861 as the system 0 packet stream, and turn the signal to the system 1. Accordingly, the system 0 signal outputted from the node apparatus 902 is turned to the system 1 in the node apparatus 901, then turned to the system 0 in the node apparatus 902. In this manner, the signal is transmitted around the network. As described above, two rings are constructed from the point of disconnection of parallel transmission path, and communication is possible within the respective rings.

[Seventh Embodiment]

Next, a seventh embodiment of the present invention will be described.

Figure 11:
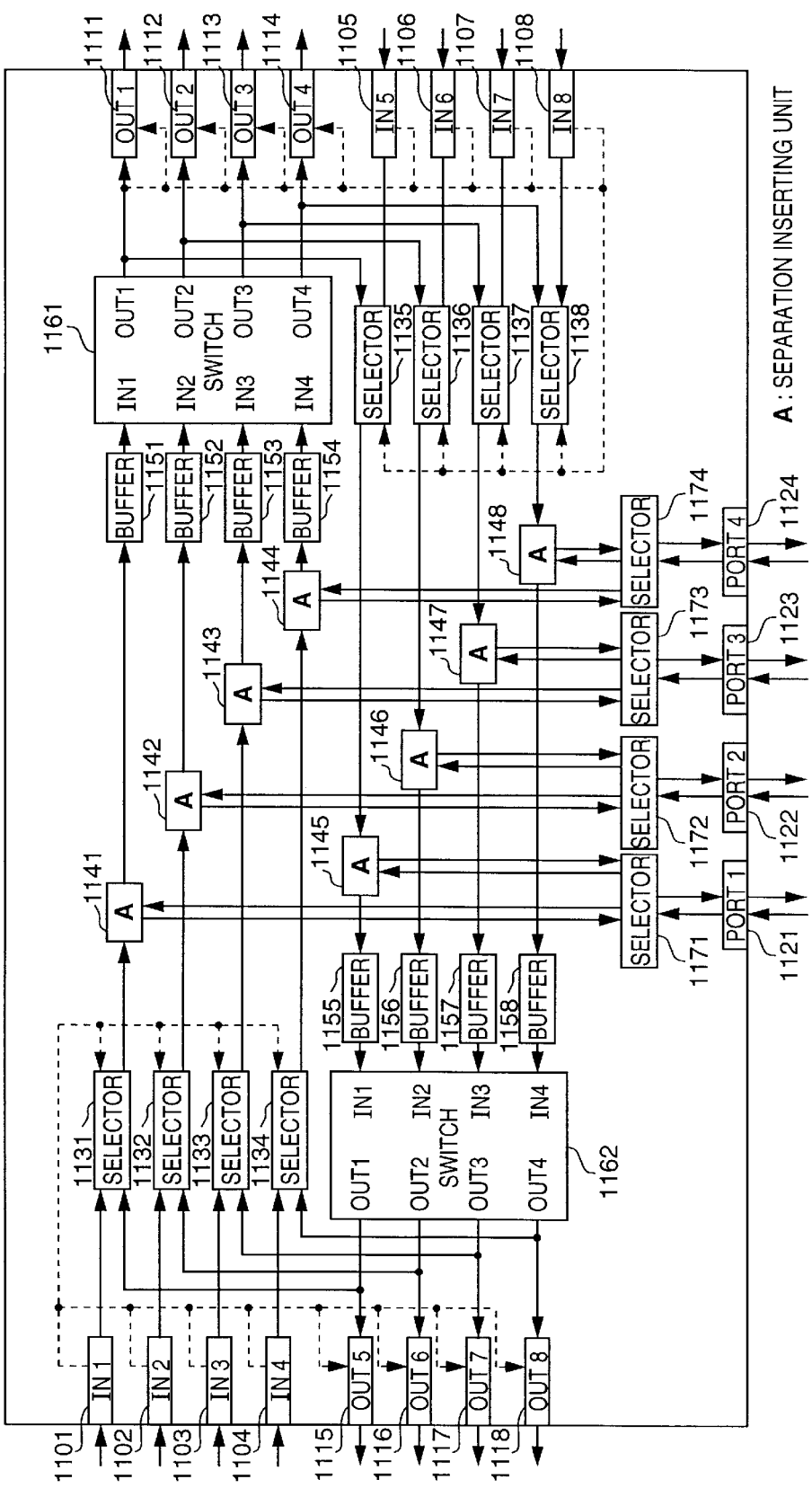
FIG. 11 is a block diagram showing the construction of the node apparatus according to a seventh embodiment of the present invention.

FIG. 11 shows the construction of the node apparatus according to the present embodiment. The node apparatus comprises input/output ports PORTI to PORT4 for connection with fourth terminals via transmission paths such as twisted pair cables, eight input terminals IN1 to IN8 and eight output terminals OUT1 to OUT8 for connection between the node apparatuses via parallel multiplex transmission paths such as multiple-core optical fiber cables. In FIG. 11, numerals 1101 to 1108 denote the input terminals IN1 to IN8 for inputting a signal from the parallel multiplex transmission paths. The input terminals respectively include a photoreceptor or the like to convert an optical signal to an electric signal. Numerals 1111 to 1118 denote the output terminals OUT1 to OUT8 for outputting a signal to the parallel multiplex transmission paths. The output terminals respectively include a phototransmitter or the like to convert an electric signal to an optical signal. Numerals 1121 to 1124 denote the input/output ports PORT1 to PORT4 for connection with a terminal via a twisted pair cable or the like. Numerals 1131 to 1138 denote 2-input 1-output selectors for selecting a signal from the input terminals IN1 to IN8 or an output signal from switches 1161 and 1162 and outputting the selected signal. Numerals 1141 to 1148 denote separation inserting units for separating a packet, to be sent to a terminal, from a packet stream transmitted from a parallel multiplex transmission path, and inserting a packet sent from a terminal into the packet stream. The separation inserting units 1141 to 1148 detect a destination address of a packet from the selectors 1131 to 1138. If the destination is a terminal connected to one of the separation inserting units, the packet is outputted to the selectors 1171 to 1174; otherwise, the packet is outputted the packet to the buffers 1151 to 1158. Further, the separation inserting units 1141 to 1148 insert a packet from the selectors 1171 to 1174 into a gap of the packet stream from the selectors 1131 to 1138 so as to output the packet to the buffers 1151 to 1158. Numerals 1151 to 1158 denote the buffers, having storage areas separated for destination output terminals, for temporarily storing input data. The buffers 1151 to 1158 respectively. Numerals 1161 and 1162 denote 4×4 switches for connecting an signal inputted from an input terminal to an arbitrary output terminal.

FIG. 12 shows the construction of a network of the present embodiment. Numerals 1201 to 1205 denote the node apparatuses of the present embodiment; and 1211 to 1254, the terminals. The output terminals OUT1 to OUT4 of each node apparatus are connected to the input terminals IN1 to IN4 of the adjacent node apparatus via the parallel multiplex transmission paths. The output terminals OUT5 to OUT8 of each node apparatus are connected to the input terminals IN5 to IN8 of the adjacent node apparatus via the parallel multiplex transmission paths. The parallel multiplex transmission paths are a plurality of spatially separated optical fiber transmission paths, or a single wavelength-multiplex optical-fiber transmission path. Further, the node apparatuses and the terminals are connected with a pair of forward and reverse directional twisted pair cables, optical fiber cables or the like.

General ring networks have a double-ring construction including a present system and a spare system. In normal operation, communication is performed by only using the present system; in fault detected operation, communication is continued by performing loop-back operation to construct a single-ring construction by using both present and spare systems. However, the present network is a bi-directional multiple-ring type network where communication is performed by using a bi-directional ring system in normal operation, and in fault detected status, communication is performed by performing loop-back operation to form a unidirectional multiple-ring construction by using both systems. The communication operation will be described in detail below.

First, the signal flow in the network will be described. For convenience of explanation, a counterclockwise ring is referred to as the system 0, while a clockwise ring is referred to as the system 1. In each node apparatus, with regard to a signal sent from a terminal, a destination terminal determines a ring which can shorten the transmission distance, a mode apparatus to send a signal determines a ring which can shorten the transmission distance to a terminal, and inserts a signal into the selected ring. For example, when a signal is transmitted from a terminal connected to the node apparatus 1203 to a terminal connected to the node apparatus 1204 or 1205, the signal is inserted into the system 0. If the signal is transmitted to a terminal connected to the node apparatus 1201 or 1202, the signal is inserted into the system 1. Further, if the signal is transmitted to a terminal connected to the node apparatus 1203, the signal is inserted in the system 0 or the system 1 so as to be transmitted around the ring. For the above-described transmission, in each node apparatus, an address table where rings are pre-determined in correspondence with destinations is set when the node apparatuses is turned on.

Next, the communication operation of the present network will be described as an example where communication is performed between the terminal 1231 and the terminal 1213. The terminal 1231 divides data to be transmitted into fixed-length packets such as ATM (Asynchronous Transfer Mode) cells. A destination address (destination: node apparatus 1201, PORT3) is written in the header of each packet, and the packet is transmitted. The packet is transmitted through the twisted pair cable, and inputted into the input/output port 1121. The destination of the packet is detected in the selector 1171, and as described above, the packet is outputted to the separation inserting unit 1145 so as to be inserted into the system 1 closer to the destination. The packet is inserted by the separation inserting unit 1145 into a gap in a packet stream from the selector 1135, and is temporarily stored in the buffer 1155. The buffers 1151 to 1158 respectively have four destination-designated storage areas (CH1 to CH4) corresponding to the output terminals OUT1 to OUT4 of the switches 1161 and 1162 and one destination-undesignated storage area. In the buffers, the destination address of an input packet is detected. If the destination is a terminal connected to the same system (system 0 or 1) in the adjacent downstream node apparatus, the packet is stored into a destination-designated storage area corresponding to the transmission channel (CH1 to CH4) connected to the terminal; otherwise, the packet is stored into the destination-undesignated area. In this case, the destination (destination: node apparatus 1201, PORT3) of the packet inputted into the buffer 1155 is not a terminal connected to the same system in the adjacent downstream node apparatus. Accordingly, the packet is stored into the destination-undesignated area, and is read by an instruction from a controller (not shown).

The controller periodically controls the input/output connection relation of the switches 1161 and 1162 in accordance with a repetitive pattern. The controller reads packets stored in predetermined storage areas of the respective buffers in accordance with the connection relation of the switches. For example, as shown in FIG. 3, when the connection relation of the switches 161 and 162 is at a phase 1 (IN1→OUT1, IN2→OUT2, IN3→OUT3, IN4→OUT4), the relation enters a phase 2 (IN1→OUT2, IN2→OUT3, IN3→OUT4, IN4→OUT1) after a one-packet length period, then enters a phase 3 (IN1→OUT3, IN2→OUT4, IN3→OUT1, IN4→OUT2) after a two-packet length period, then enters a phase 4 (IN1→OUT4, IN2→OUT1, IN3→OUT2, IN4→OUT3) after a three-packet length period, and returns to the phase 1 after a fourpacket length period. This pattern is repeated. The phase change period and the repetitive pattern are not limited to the above-described period and pattern, however, the phase change period is set to an integral multiple of the packet length.

When the connection relation is at the phase 1, the controller reads packets from the destination-designated storage area CH1 of the buffers 1151 and 1155, the destination-designated storage area CH2 of the buffers 1152 and 1156, the destination-designated storage area CH3 of the buffers 1153 and 1157, and the destination-designated storage area CH4 of the buffers 1154 and 1158. When the connection relation is at the phase 2, the controller reads packets from the destination-designated storage area CH2 of the buffers 1151 and 1155, the destination-designated storage area CH3 of the buffers 1152 and 1156, the destination-designated storage area CH4 of the buffers 1153 and 1157, and the destination-designated storage area CH1 of the buffers 1154 and 1158. When the connection relation is at the phase 3, the controller reads packets from the destination-designated storage area CH3 of the buffers 1151 and 1155, the destination-designated storage area CH4 of the buffers 1152 and 1156, the destination-designated storage area CH1 of the buffers 1153 and 1157, and the destination-designated storage area CH2 of the buffers 1154 and 1158. When the connection relation is at the phase 4, the controller reads packets from the destination-designated storage area CH4 of the buffers 1151 and 1155, the destination-designated storage area CH1 of the buffers 1152 and 1156, the destination-designated storage area CH2 of the buffers 1153 and 1157, and the destination-designated storage area CH3 of the buffers 1154 and 1158. At the respective phases, if a packet is not stored in a destination-designated storage area, a packet is read from a destination-undesignated storage area. By this control, a packet for the same system in the adjacent downstream node apparatus is switched to a destination transmission channel through a switch, while a packet for another destination is switched to an available channel.

Accordingly, in this example, the packet stored in the destination-undesignated storage area of the buffer 1155 is read at the phase 4 since no packet is stored in the destination-designated storage area CH4 at the phase 4. The packet is transmitted from the input terminal IN1 to the output terminal OUT4 in the switch 1162, converted into an optical signal in the output terminal 118, and outputted to the transmission channel CH4 of the parallel multiplex transmission paths.

The packet transmitted from the node apparatus 1203 is inputted into the input terminal 1108 of the node apparatus 1202, then converted into an electric signal and inputted into the selector 1138. The selector 1138 selects the signal and outputs the signal to the separation inserting unit 1148. The signal is inputted through the separation inserting unit 1148 to the buffer 1158. As the destination of the packet is the transmission channel CH3 of the same system in the adjacent downstream apparatus, the packet is stored in the destination-designated storage area CH3 of the buffer 1157. The packet is read at the phase 4, and inputted from the input terminal IN4 and outputted to the output terminal OUT3 in the switch 1161. The output packet is converted into an optical signal in the output terminal 1117, and outputted to the transmission channel CH3 of the parallel multiplex transmission paths.

The packet transmitted from the node apparatus 1202 is inputted into the input terminal 1107 of the node apparatus 1201, then converted into an electric signal and inputted into the selector 1137. The selector 1137 selects the signal and outputs the signal to the separation inserting unit 1147. As the destination of the packet is the terminal 1233 connected via the transmission path to the separation inserting unit 1147, the separation inserting unit 1147 separates the packet from the packet stream, and sends the packet to the selector 1173. The packet is transmitted through the selector 1173, outputted from the input/output port PORT3, and transmitted through the twisted pair cable to the terminal 1233. The communication is made in this manner.

In the present embodiment, as a ring closer to a destination can be selected, the average transmission distance is about ¼ of the ring length.

Next, the communication operation upon occurrence of a fault such as disconnection of parallel multiplex transmission path will be described. In the following description, the parallel multiplex transmission paths between the node apparatus 1202 and the node apparatus 1203 are disconnected.

In this case, as no optical signal is inputted from the parallel multiplex transmission path into the input terminals 1101 to 1104 of the node apparatus 1203, the selectors 1131 to 1134 select an output signal from the switch 1162 as the system 1 packet stream and turn (loop back) the signal to the system 0. At this time, the input terminals 1101 to 1104 send information indicative of stoppage of optical input to the output terminals 1115 and 1118 so as to stop transmission of optical signal. When the optical signal from the output terminals 1115 to 1118 stops, stoppage of optical signal input is detected in the input terminals 1105 to 1108 of the node apparatus 1202. The selectors 1135 to 1138 select an output signal from the switch 1161 as the system 0 packet stream, and turn the signal to the system 1. Thus, the ring is reconstructed with the systems 0 and 1, and communication is restarted. Note that in the buffers of the looped back side node apparatus, the same-system adjacent-downstream node address, used for storing a packet into a destination-designated storage area, is changed. Accordingly, the same-system adjacent-downstream node address in normal operation and a same-system adjacent-downstream node in fault detected status are stored in advance. When loop-back operation is performed, communication can be performed by changing the address with the stored address in fault detected status. For example, an address in normal operation (node apparatus: 1203, PORT1–PORT4) as the same-system adjacent-downstream node address, and an address (node apparatus: 1202, PORT1–PORT4) as the address in fault detected status are stored in the buffers 1151 to 1154 of the node apparatus 1202. Communication is performed by using these addresses in accordance with information from the input terminals 1105 to 1108.

The faults corrected by the above method are the disconnection of the parallel multiplex transmission path, decrease of optical-transmission output power due to fault of the phototransmitter of the output terminals 1111 to 1118, occurrence of asynchronous state due to fault of the photoreceptor of the input terminals 1101 to 1108 and the like.

Further, as the maximum communication capacity in fault detected operation is the half of that in normal operation, reception limitation control and the like are performed such that the communication capacity does not exceed the maximum value.

In this arrangement, the fault solution operation can be made without a spare line.

[Eight Embodiment]

Next, the communication operation in a case where only the node apparatus in FIG. 11 is used will be described.

As described in the seventh embodiment, when the parallel multiplex transmission paths are not connected to the node apparatus, the system 0 is changed to the system 1 or the system 1 is changed to the system 0. Accordingly, if only one node apparatus is used, the selectors 1131 to 1134 select a signal from the switch 1162, and the selectors 1135 to 1138 select a signal from the switch 1161. Thus, a ring network is formed within the node apparatus.

As an example of the communication operation, signal transmission from a terminal connected to the input/output port 1121 to a terminal connected to the input/output port 1123 will be described.

The terminal connected to the input/output port 1121 divides data to be transmitted into fixed-length packets. A destination address (destination: node apparatus (1203), PORT3) is written in the header of each packet, and the packet is transmitted. The packet inputted from the input/output port 1121 through the twisted pair cable is outputted, e.g., to the separation inserting unit 1141 in the system 0, by the selector 1171, then inserted by the separation inserting unit 1141 into a gap in a packet stream from the selector 1131, and temporarily stored into the buffer 1151. At this time, an address (destination: node apparatus (1203), PORT1–PORT4) as the same-system adjacent-downstream node addresses in fault detected status is stored in the buffer 1151. As the address of the input packet coincides with the address in the buffer 1151, the packet is stored into the destination-designated storage area CH3 corresponding to the destination terminal. The packet is read at the phase 3, and inputted from the input terminal IN1 and outputted to the output terminal OUT3 in the switch 1161. The output packet is inputted through the selector 1137 to the separation inserting unit 1147. As the destination of the packet is the terminal connected to the separation inserting unit 1147 via the transmission path, the separation inserting unit 1147 separates the packet from the packet stream and sends the packet to the input/output port PORT3. The packet is transmitted through the twisted pair cable to the terminal.

In the above operation, the connection in the switch 1161 is set at the phase 3 only once for four packets, therefore, if packets are inputted into more particular destination-designated storage areas, the buffer storage may overflow. Accordingly, the maximum capacity of communication from a terminal is limited to ¼ or less than the transmission capacity in the respective buffers. If the communication capacity is greater than the transmission capacity, the following operation is made.

As an example of the communication operation, a case where a terminal connected to the input/output port 1121 continuously transmits four packets to a terminal connected to the input/output port 1123 will be described.

The terminal connected to the input/output port 1121 divides data to be transmitted into four fixed-length packets, and writes a destination address (destination: node apparatus (1203), PORT3) in the header of each packet, and transmits the packets. The four packet are transmitted through the twisted pair cable and inputted from the input/output port 1121. The packets are outputted from the selector 1171 to the separation inserting unit 1145 in the system 1, and inserted by the separation inserting unit 1145 into a gap in a packet stream from the selector 1135, and stored into destination-undesignated storage areas of the buffer 1155. The packets are sequentially read at the respective phases, from the input terminal IN1, to the output terminal OUT1, then to the output terminal OUT2, then to the output terminal OUT3, and to the output terminal OUT4, by one packet, in the switch 1162. The output packets are respectively selected by the selectors 1131 to 1134, and inputted through the separation inserting units 1141 to 1144 into the buffers 1151 to 1154. At this time, an address (destination: node apparatus (1203), PORT1–PORT4) as the same-system adjacent-downstream node address in fault detected status is stored in the buffers 1151 to 1154. As the address of the input packet coincides with the address in the buffer 1151, the packet is stored into the destination-designated storage area CH3 corresponding to the destination terminal. The packet is read at the phase 3, and inputted from the input terminal IN1 and outputted to the output terminal OUT3 in the switch 1161. Further, the packet stored in the buffer 1152 is read at the phase 2, and inputted from the input terminal IN2 and outputted to the output terminal OUT3 in the switch 1161. Further, the packet stored in the buffer 1153 is read at the phase 1, and inputted from the input terminal IN3 and outputted to the output terminal OUT3 in the switch 1161. Further, the packet stored in the buffer 1154 is read at the phase 4, and inputted from the input terminal IN4 and outputted to the output terminal OUT3 in the switch 1161. The output four packets are inputted through the selector 1137 into the separation inserting unit 1147. As the destination of the packets is the terminal connected to the separation inserting unit 1147 via the transmission path, the separation inserting unit 1147 separates the packets from the packet stream and sends the packets to the input/output port PORT3. The packets are transmitted through the twisted pair cable to the terminal.

In this arrangement, as the speed of writing and that of reading at the buffers 1151 to 1154 are the same, communication can be made without causing buffer overflow. Accordingly, communication can be performed within a single node apparatus.

As described above, according to the present invention, it is possible to construct a network in a flexible manner and realize a network where a fault is easily corrected.

Further, when communication is performed by using only one node apparatus, external transmission path may be omitted. Further, the number of the node apparatuses can be easily increased from such status.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus capable of transmitting a signal to a first channel group comprising a plurality of channels in a first transmission direction and a second channel group comprising a plurality of channels in a second transmission direction different from said first transmission direction, comprising;

first reception means for receiving a signal from a channel in said first channel group;

first switch means for outputting the signal received by said first reception means to one of the plurality of channels in said first channel group, in accordance with a predetermined pattern; and first selection means for selecting whether the signal outputted from said first switch means is to be outputted to a channel in said first channel group or to a channel in said second channel group, wherein even when the signal is outputted to the channel in said second channel group, said first switch means outputs the signal to one of the plurality of channels in said second channel group, in accordance with the predetermined pattern.

2. The communication apparatus according to claim 1, further comprising:

second reception means for receiving a signal from a channel in said second channel group; and second switch means for outputting the signal received by said second reception means to one of the plurality of channels in said second channel group, in accordance with the predetermined pattern.

3. The communication apparatus according to claim 2, further comprising second selection means for selecting whether the signal outputted from said second switch means is to be outputted to a channel in said first channel group or to a channel in said second channel group.

4. The communication apparatus according to claim 3, wherein even when the signal is outputted to the channel in said first channel group, said second switch means outputs the signal to the plurality of channels in said second channel group.

5. The communication apparatus according to claim 1, further comprising first buffer means for storing the signal received by said first reception means and outputting the signal in accordance with a channel to which the signal is to be outputted, wherein said first switch means has a plurality of input terminals for inputting the signal outputted from said first buffer means in accordance with said channel, and a plurality of output terminals for outputting the signal inputted from said plurality of input terminals to the plurality of channels in said first channel group.

6. The communication apparatus according to claim 5, wherein said first switch means switches the signal received by said first reception means by changing connection relation between said plurality of input terminals and said plurality of output terminals.

7. The communication apparatus according to claim 6, wherein said first switch means changes the connection relation between said plurality of input terminals and said plurality of output terminals based on the predetermined pattern which avoids connection between at least two of said plurality of input terminals and one of said plurality of output terminals.

8. The communication apparatus according to claim 6, wherein the signal stored in said first buffer means is read in accordance with change of connection between said plurality of input terminals and said plurality of output terminals in said first switch means.

9. The communication apparatus according to claim 2, further comprising second buffer means for storing the signal received by said second reception means and outputting the signal in accordance with a channel to which the signal is t o be outputted, wherein said second switch means has a plurality of input terminals for inputting the signal outputted from said second buffer means in accordance with said channel, and a plurality of output terminals for outputting the signal inputted from said plurality of input terminals to the plurality of channels in said first channel group.

10. The communication apparatus according to claim 9, wherein said second switch means switches the signal received by said second reception means by changing connection relation between said plurality of input terminals and said plurality of output terminals.

11. The communication apparatus according to claim 10, wherein said second switch means changes the connection relation between said plurality of input terminals and said plurality of output terminals based on a predetermined pattern which avoids connection between at least two of said plurality of input terminals and one of said plurality of output terminals.

12. The communication apparatus according to claim 10, wherein the signal stored in said second buffer means is read in accordance with change of connection between said plurality of input terminals and said plurality of output terminals in said second switch means.

13. The communication apparatus according to claim 1, further comprising second reception means for receiving the signal from the channel in said second channel group, wherein if said second reception means cannot normally receive the signal, said first selection means outputs the signal outputted from said first switch means to the channel in said second channel group.

14. The communication apparatus according to claim 3, wherein if said first reception means cannot normally receive the signal, said second selection means outputs the signal outputted from said second switch means to the channel in said first channel group.

15. The communication apparatus according to claim 1, further comprising separation means for separating a desired signal from signals received by said first reception means and outputting the signal to a subtransmission path connected to said communication apparatus.

16. The communication apparatus according to claim 15, wherein said subtransmission path is connected to a terminal device.

17. The communication apparatus according to claim 15, wherein said separation means is provided in correspondence with each channel of said first channel group.

18. The communication apparatus according to claim 1, further comprising:

second reception means for receiving the signal from the channel in said second channel group; and separation means for separating a desired signal from signals received by said second reception means and outputting the signal to a subtransmission path connected to said communication apparatus.

19. The communication apparatus according to claim 18, wherein said subtransmission path is connected to a terminal device.

20. The communication apparatus according to claim 18, wherein said separation means is provided in correspondence with each channel in said second channel group.

21. The communication apparatus according to claim 1, further comprising insertion means for inserting a signal other than the signal received by said first reception means between a plurality of signals received by said first reception means.

22. The communication apparatus according to claim 21, wherein the signal inserted by said insertion means is a signal sent from a subtransmission path connected to said communication apparatus.

23. The communication apparatus according to claim 21, wherein the signal inserted by said insertion means is a signal sent from a terminal device connected to said communication apparatus.

24. The communication apparatus according to claim 1, further comprising:
    second reception means for receiving the signal from the channel in said second channel group; and
    insertion means for inserting a signal other than the signal received by said second reception means between a plurality of signals received by said second reception means.

25. The communication apparatus according to claim 24, wherein the signal inserted by said insertion means is a signal sent from a subtransmission path connected to said communication apparatus.

26. The communication apparatus according to claim 24, wherein the signal inserted by said insertion means is a signal sent from a terminal device connected to said communication apparatus.

27. A control method for a communication apparatus capable of transmitting a signal to a first channel group comprising a plurality of channels in a first transmission direction and a second channel group comprising a plurality of channels in a second transmission direction different from said first transmission direction, comprising;
    a first reception step of receiving a signal from a channel in said first channel group;
    a first switch step of outputting the signal received at said first reception step to one of the plurality of channels in said first channel group, in accordance with a predetermined pattern; and
    a first selection step of selecting whether the signal outputted at said first switch step is to be outputted to a channel in said first channel group or to a channel in said second channel group,
        wherein even when the signal is outputted to the channel in said second channel group, the signal is outputted to one of the plurality of channels in said second channel group at said first switch step, in accordance with the predetermined pattern.

28. The method according to claim 27, further comprising:
    a second reception step of receiving a signal from a channel in said second channel group; and
    a second switch step of outputting the signal received at said second reception step to one of the plurality of channels in said second channel group, in accordance with the predetermined pattern.

29. The method according to claim 28, further comprising a second selection step of selecting whether the signal outputted at said second switch step is to be outputted to a channel in said first channel group or to a channel in said second channel group.

30. The method according to claim 29, wherein even when the signal is outputted to the channel in said first channel group, the signal is outputted to the plurality of channels in said second channel group at said second switch step.

31. The method according to claim 27, further comprising a first buffer step of storing the signal received at said first reception step and outputting the signal in accordance with a channel to which the signal is to be outputted,
    wherein said first switch step is performed by a plurality of input terminals for inputting the signal outputted at said first buffer step in accordance with said channel, and a plurality of output terminals for outputting the signal inputted from, said plurality of input terminals to the plurality of channels in said first channel group.

32. The method according to claim 31, wherein at said first switch step, the signal received at said first reception step is switched by changing connection relation between said plurality of input terminals and said plurality of output terminals.

33. The method according to claim 32, wherein at said first switch step, the connection relation between said plurality of input terminals and said plurality of output terminals is changed based on the predetermined pattern which avoids connection between at least two of said plurality of input terminals and one of said plurality of output terminals.

34. The method according to claim 32, wherein the signal stored at said first buffer step is read in accordance with change of connection between said plurality of input terminals and said plurality of output terminals in said first switch means.

35. The method according to claim 28, further comprising a second buffer step of storing the signal received at said second reception step and outputting the signal in accordance with a channel to which the signal is to be outputted,
    wherein said second switch step is performed by a plurality of input terminals for inputting the signal outputted at said second buffer step in accordance with said channel, and a plurality of output terminals for outputting the signal inputted from, said plurality of input terminals to the plurality of channels in said first channel group.

36. The method according to claim 35, wherein at said second switch step, the signal received at said second reception step is switched by changing connection relation between said plurality of input terminals and said plurality of output terminals.

37. The method according to claim 36, wherein at said second switch step, the connection relation between said plurality of input terminals and said plurality of output terminals is changed based on a predetermined pattern which avoids connection between at least two of said plurality of input terminals and one of said plurality of output terminals.

38. The method according to claim 36, wherein the signal stored at said second buffer step is read in accordance with change of connection between said plurality of input terminals and said plurality of output terminals at said second switch step.

39. The method according to claim 27, further comprising a second reception step of receiving the signal from the channel in said second channel group,
    wherein if the signal cannot be normally received at said second reception step, the signal outputted at said first switch step is outputted to the channel in said second channel group at said first selection step.

40. The method according to claim 29, wherein if the signal cannot normally received at said first reception step, the signal outputted at said second switch step is outputted to the channel in said first channel group at said second selection step.

41. The method according to claim 27, further comprising a separation step of separating a desired signal from signals received at said first reception step and outputting the signal to a subtransmission path connected to said communication apparatus.

42. The method according to claim 41, wherein said subtransmission path is connected to a terminal device.

43. The method according to claim 41, wherein said separation step is performed in correspondence with each channel of said first channel group.

44. The method according to claim 27, further comprising:

a second reception step of receiving the signal from the channel in said second channel group; and a separation step of separating a desired signal from signals received at said second reception step and outputting the signal to a subtransmission path connected to said communication apparatus.

45. The method according to claim 44, wherein said subtransmission path is connected to a terminal device.

46. The method according to claim 44, wherein said separation step is performed in correspondence with each channel in said second channel group.

47. The method according to claim 27, further comprising an insertion step of inserting a signal other than the signal received at said first reception step between a plurality of signals received at said first reception step.

48. The method according to claim 47, wherein the signal inserted at said insertion step is a signal sent from a subtransmission path connected to said communication apparatus.

49. The method according to claim 47, wherein the signal inserted at said insertion step is a signal sent from a terminal device connected to said communication apparatus.

50. The method according to claim 27, further comprising:

a second reception step of receiving the signal from the channel in said second channel group; and an insertion step of inserting a signal other than the signal received at said second reception step between a plurality of signals received at said second reception step.

51. The method according to claim 50, wherein the signal inserted at said insertion step is a signal sent from a subtransmission path connected to said communication apparatus.

52. The method according to claim 50, wherein the signal inserted at said insertion step is a signal sent from a terminal device connected to said communication apparatus.

* * * * *

UNITED STATES PATENT AND TRADEMARK OFFICE
CERTIFICATE OF CORRECTION

PATENT NO. : 6,317,429 B1
DATED : November 13, 2001
INVENTOR(S) : Nakata et al.

It is certified that error appears in the above-identified patent and that said Letters Patent is hereby corrected as shown below:

Column 3,
Line 2, delete "described" and insert therefore -- described. --

Column 5,
Line 26, delete "0UT8" and insert therefor -- OUT8 --

Column 6,
Line 25, delete "(201→4204)" and insert therefor -- (201→204) --
Line 27, delete "(204→4201)" and insert therefor -- (204→201) --
Line 58, delete "POR5" and insert therefor -- PORT5 --

Column 8,
Line 10, delete "terminal 18," and insert therefor -- terminal 118, --
Line 15, delete "into-an-,electric-signal" and insert therefor -- into an electric signal --
Line 24, delete "selector 113" and insert therefor -- selector 131 --

Column 11,
Line 46, delete "851 to 851" and insert therefor -- 851 to 854 --

Column 12,
Line 33, delete "CHi" and insert therefor -- CH1 --
Line 35, delete "85 2" and insert therefor -- 852 --
Line 42, delete "CHi" and insert therefor -- CH1 --

Column 14,
Line 12, delete "CHi" and insert therefor -- CH1 --

Column 15,
Line 60, delete "trough" and insert therefor -- through --

Column 17,
Line 57, delete "901→4 904→903," and insert therefor -- 901→904→903, --

Column 18,
Line 32, delete "OUT3." and insert therefor -- OUT3 --
Line 63, delete "around." and insert therefor -- around --

UNITED STATES PATENT AND TRADEMARK OFFICE
CERTIFICATE OF CORRECTION

PATENT NO. : 6,317,429 B1
DATED : November 13, 2001
INVENTOR(S) : Nakata et al.

It is certified that error appears in the above-identified patent and that said Letters Patent is hereby corrected as shown below:

Column 19,
Line 66, delete "an signal" and insert therefor -- a signal --

Column 20,
Line 7, delete "OUTS" and insert therefor -- OUT5 --

Column 21,
Line 32, delete "fourpacket" and insert therefor -- four-packet --

Column 23,
Line 27, delete "[Eight Embodiment]" and insert therefor -- [Eighth Embodiment] --

Column 24,
Line 18, delete "four packet" and insert therefor -- four packets --

Column 26,
Line 14, delete "t o" and insert therefor -- to --

Column 28,
Line 17, delete "from," and insert therefor -- from --

Signed and Sealed this

Twentieth Day of August, 2002

Attest:

JAMES E. ROGAN
Attesting Officer
Director of the United States Patent and Trademark Office